United States Patent [19]

Meurer

[11] Patent Number: 4,865,753
[45] Date of Patent: Sep. 12, 1989

[54] CLARIFIER APPARATUS AND METHODS HAVING RELEASABLY CLOSED FLOW CHANNELS

[76] Inventor: Charles L. Meurer, 23553 Pondwiew, Golden, Colo. 80401

[21] Appl. No.: 207,987

[22] Filed: Jun. 17, 1988

[51] Int. Cl.⁴ .............................................. B01D 21/00
[52] U.S. Cl. .................................. 210/802; 210/522; 210/242.1
[58] Field of Search ..................... 210/802, 109, 242.1, 210/521, 522, 138, 232

[56] References Cited

U.S. PATENT DOCUMENTS

| | | | |
|---|---|---|---|
| 3,399,135 | 8/1968 | Conley et al. | 210/521 |
| 3,491,892 | 1/1970 | McCann | 210/521 |
| 3,613,889 | 10/1971 | Reed | 210/522 |
| 3,894,955 | 7/1975 | Forsell | 210/522 |
| 3,903,000 | 9/1975 | Miura et al. | 210/522 |
| 3,925,205 | 12/1975 | Sparham | 210/522 |
| 3,963,624 | 6/1976 | Henderson et al. | 210/521 |
| 4,089,782 | 5/1978 | Huebner | 210/522 |
| 4,120,796 | 10/1978 | Huebner | 210/522 |
| 4,120,797 | 10/1978 | Huebner | 210/522 |
| 4,184,955 | 1/1980 | Arvanitakis | 210/522 |
| 4,305,819 | 12/1981 | Kobozev et al. | 210/242.1 |
| 4,446,027 | 5/1984 | Simmers | 210/661 |
| 4,514,303 | 4/1985 | Moore | 210/521 |
| 4,526,691 | 7/1985 | Melis et al. | 210/521 |

FOREIGN PATENT DOCUMENTS

0107114  5/1984  European Pat. Off. ............ 210/521

*Primary Examiner*—Peter Hruskoci
*Assistant Examiner*—Coreen Y. Lee
*Attorney, Agent, or Firm*—Rothgerber, Appel, Powers & Johnson

[57] ABSTRACT

A detention basin contains liquid and solids suspended therein. A planar flow control deck extending across a part of the basin is formed from a plurality of elongated flap members. One edge of each such flap member is fixed and an opposite edge is in releasable sealing engagement with the fixed edge of an adjacent flap member. That opposite edge of each flap member is free to move out of engagement with the adjacent flap member in response to the upward flow of the liquid in the basin. Inclined lamina form quiescent zones in which the liquid flow is reduced so that the solids settle and are separated from the liquid. The lamina are suspended in the basin in parallel relationship, with the angle at which the lamina are inclined being adjustable by a submerged adjustment mechanism. Each zone is open at the bottom to receive the liquid laden with the solids. The top of each quiescent zone is closed by the cooperation of the flap members. Each lamina is supported at a vertex connected to a flap member. In combination, the flap members form the flow control deck that promotes uniform liquid flow through all of the quiescent zones. The deck and the lamina can be installed in detention basins having square, rectangular or circular walls. The lamina are constructed of woven strips of steel or plastic.

49 Claims, 16 Drawing Sheets

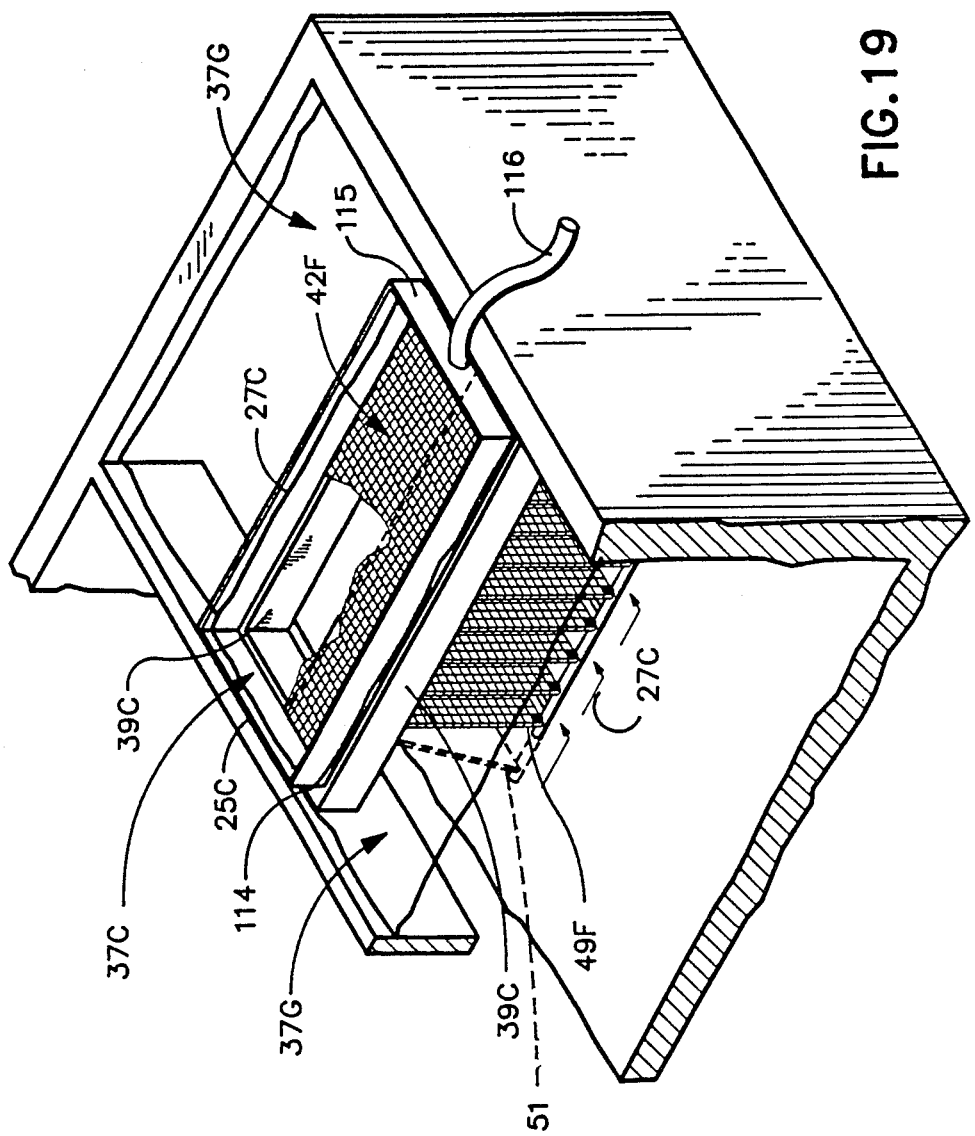

CLARIFIER APPARATUS AND METHODS HAVING RELEASABLY CLOSED FLOW CHANNELS

BACKGROUND OF THE INVENTION

1. Field of the Invention

This invention relates to liquid treatment and more particularly to controlling the flow of particle-laden water to promote particle settlement in water and waste water clarification systems.

2. Description of the Prior Art

Clarifiers are used to remove certain materials or particles from liquid. These materials are generally suspended in the liquid and can be removed under the force of gravity when the flow of the liquid is substantially reduced, as in a very low flow, or quiescent, zone in the clarifier. Since these materials are generally solid and are said to "settle" out of the liquid, they are referred to as "settleable solids". Such settleable solids may include naturally occurring materials (e.g., clay, silts, sand and dirt), chemical precipitants and biological solids. The word "solids" as used herein to describe the present invention refers to such settleable solids.

Clarifiers are used, for example, in water and waste water treatment plants. In water treatment, the water drawn from a water supply has various non-settleable colloidal solids therein. When mixed with chemicals, the colloidal solids and chemicals agglomerate to form solids. In waste water treatment, the solids include organic solids, among other wastes. Water and waste water are treated in clarifiers to remove such solids, thereby making the water clear and suitable for use, reuse, or for further treatment, such as tertiary treatment. The word "liquid" as used herein to describe the present invention refers to water and waste water.

An object of water and waste water clarifiers is to create quiescent zones having very low flow rates to promote maximum settlement of solids to the bottom of the clarifiers. Clarifiers typically include a large detention basin where the settlement of the solids occurs. Tubes or flat sheets mounted at fixed angles relative to the surface of the liquid have been used to form multiple thin liquid flow paths and create quiescent zones within the detention basin in an attempt to promote settling of solids. Plates have also been mounted within detention basins at fixed angles relative to the surface of the liquid. To date, such plates have been constructed out of relatively heavy, single sheets of metal or plastic that are supported on their sides and connected to the sidewalls of self-contained modules positioned within detention basins. The liquid containing the solids flows upwardly between the plates or tubes at flow rates that generally allow sufficient time for most of the solids to settle onto the plates or tubes. Ideally, the solids then slide down the plates or tubes to the bottom of the detention basin for collection. Clarified liquid flows out of the openings between and at the top of the plates or tubes.

Prior art clarifiers have also included some type of weir or trough extending across, or along the sides of, the detention basins. Such weirs or troughs are effective to form a relatively thick (e.g., two feet) layer of partially clarified liquid on top of the plates or tubes. The weight of such weirs or troughs necessitates additional support within or surrounding the detention basin, adding to the weight and expense of the clarifiers. In general, the liquid flowing from the tubes or plates into this thick layer is subject to changes in flow rate due to random variations in the upward flow of the liquid through different ones of the quiescent zones of the clarifier. This thick layer is used to diffuse the flow of the liquid from the quiescent zones to the weirs, rendering the flow of the liquid more uniform as the liquid enters the weirs that are at the perimeter of the basin or that extend across the basin.

SUMMARY OF THE INVENTION

Applicant has studied prior clarifiers in an endeavor to improve the settlement of solids while reducing the weight and cost of such clarifiers. Such studies indicate that solids are often disturbed by random movements of the liquid within a clarifier. These random movements are caused by temperature gradients, surface disturbances and channelling currents within the clarifier. Parallel plates mounted at a fixed angle relative to the surface of the liquid have been used in an attempt to increase the settlement of solids within the clarifiers. It has been found, however, that the rate of liquid upflow in a channel between two adjacent fixed plates varies depending upon such random liquid movements. As a result, the amount of settling of the solids in the quiescent zone formed by such channel varies with such random liquid movements.

The present invention seeks to overcome this long-felt problem by providing methods of and apparatus for equalizing the liquid flow within all of the quiescent zones of a clarifier. The present invention promotes this equalized flow using lightweight lamina in place of the heavy plates of the prior art. The methods and apparatus of the present invention thus avoid the use of large inflexible, metal or plastic plates used in the prior art, reducing the weight and cost of clarifiers built according to the present invention.

In contrast to prior art metal plates that often have sharp edges and that are therefore difficult to remove for cleaning, it is a general object of the present invention to provide light, strong and flexible lamina for clarifying liquid while minimizing the problems found in prior art clarifiers.

A further object of the present invention is to provide methods of and apparatus for clarifying liquid wherein a horizontal planar flow control deck overlies sets of parallel lamina so that the liquid flow through quiescent zones between such sets of lamina is equalized.

Another object of the present invention is to provide methods of and apparatus for changing the angle of inclination of parallel lamina of a clarifier so as to promote maximum settlement of solids suspended in liquid.

An additional object of the present invention is to provide improved clarification of liquid by using a submerged planar flow control deck positioned near the surface of the liquid.

Yet another object of the present invention is to provide methods of and apparatus for clarifying liquid in underground detention basins having limited openings for installing plates or other barriers, wherein the barriers of the present invention are in the form of lamina rolled into cylinders for insertion into such basins through small access openings.

A still further object of the present invention is to provide methods of and apparatus for clarifying water and waste water wherein parallel lamina are connected to a horizontal planar flow controller to promote uniform flow of clarified water from settlement channels.

A related object of the present invention is to provide an adjustment mechanism for parallel lamina within a clarifier so that the lamina can be disengaged and easily removed for cleaning.

A yet additional object of the present invention is to provide methods of and apparatus for clarifying liquid that can be supported by floating structures.

It is an object of the present invention to provide methods of and apparatus for clarifying liquid wherein flexible parallel lamina are connected to a submerged adjustment mechanism that can be selectively moved both vertically and horizontally to promote settlement of solids and cleaning of the solids from the parallel lamina.

It is another object of the present invention to provide an apparatus for water and waste water clarification which is relatively easy to install so that retrofitting of an existing clarifier is commerically feasible.

It is a further object of the present invention to provide a liquid clarifier that is relatively light in weight, inexpensive and requires minimal structural support.

It is an additional object of the present invention to provide methods of and apparatus for water clarification that utilize woven, metal or plastic, lamina that are suspended in a detention basin to form quiescent zones.

It is still another object of the present invention to provide methods of and apparatus for clarifying liquid wherein unitary barriers perform both the settling function as well as the flow regulation function in a clarifier.

It is still a further object of the present invention to provide improved methods of and apparatus for clarifying liquid within a circular detention basin.

With these and other objects in mind, the present invention relates to methods of and apparatus for clarifying liquid. The apparatus for clarifying liquid is used in a detention basin for containing the liquid and the solids suspended therein. A planar flow control deck extends across at least a part of the basin and is formed from a plurality of elongated, sheet-like, flap members. Each of the flap members has two opposite edges. One edge of each such flap member is fixed and an opposite edge thereof is in releasable sealing engagement with the fixed edge of an adjacent flow controller member. That opposite edge of each flap member is free to move out of engagement with such adjacent flap member in response to the upward flow of the liquid in the clarifier basin.

In the preferred embodiment of the present invention, the detention basin is also provided with flexible, inclined lamina to form quiescent zones in which the liquid flow is reduced so that the solids carried by the liquid settle and are separated from the liquid. The lamina are suspended in the basin in parallel relationship, with the angle at which the lamina are inclined being adjustable by a submerged adjustment mechanism. Adjacent pairs of the parallel lamina form each quiescent zone, which is effective as a separate inclined settling channel. Each channel is open at the bottom to receive the liquid laden with the solids. The top of each settling channel is closed by the cooperation of the flap members, one of which extends horizontally from a vertex adjacent the top of each lamina. Each lamina is supported at the vertex leaving that flap member free to flex or otherwise allow the opposite edge of the flap member to move vertically in response to the upward flow of liquid in the settling channel. In combination, the flap members form the flow control deck that promotes uniform liquid flow through all of the settling channels. This embodiment can be installed in detention basins having square, rectangular or circular walls.

In the preferred embodiment of the invention, the lamina are constructed of woven strips of steel or plastic. The submerged adjustment mechanism is adjustable to change the angle of inclination of the lamina to maximize settlement. Additionally, the adjustment mechanism move the lamina vertically as by vibration to buckle or flex the lamina to clean the lamina without removing the lamina from the detention basin and to promote settlement of the settleable solids.

BRIEF DESCRIPTION OF THE DRAWINGS

Other objects, features and advantages of the present invention will be apparent from an examination of the following detailed descriptions, which include the attached drawings in which:

FIGS. 4A and 4B are side elevational views of two adjacent parallel lamina having the flap members as shown in FIG. 3B, illustrating the upward flow of the liquid in the quiescent zone between two adjacent parallel lamina and the flow of the liquid from such zone between a free edge of one flap member and a fixed edge of an adjacent flap member, wherein FIG. 4A shows the zone closed and FIG. 4B shows the zone open to permit such flow;

FIGS. 10A and 10B are front views of a preferred embodiment of the lamina, showing the lamina as a sheet formed from woven strips of metal or plastic, wherein FIG. 10B shows an enlarged portion of the woven strips;

FIG. 19 is a perspective view of a floating embodiment of the present invention showing four sides of one clarifier section having a flotation structure for supporting the flow control deck and the plurality of parallel lamina depending therefrom.

DETAILED DESCRIPTION OF THE PREFERRED EMBODIMENTS

Clarifier 25

Figure 1:
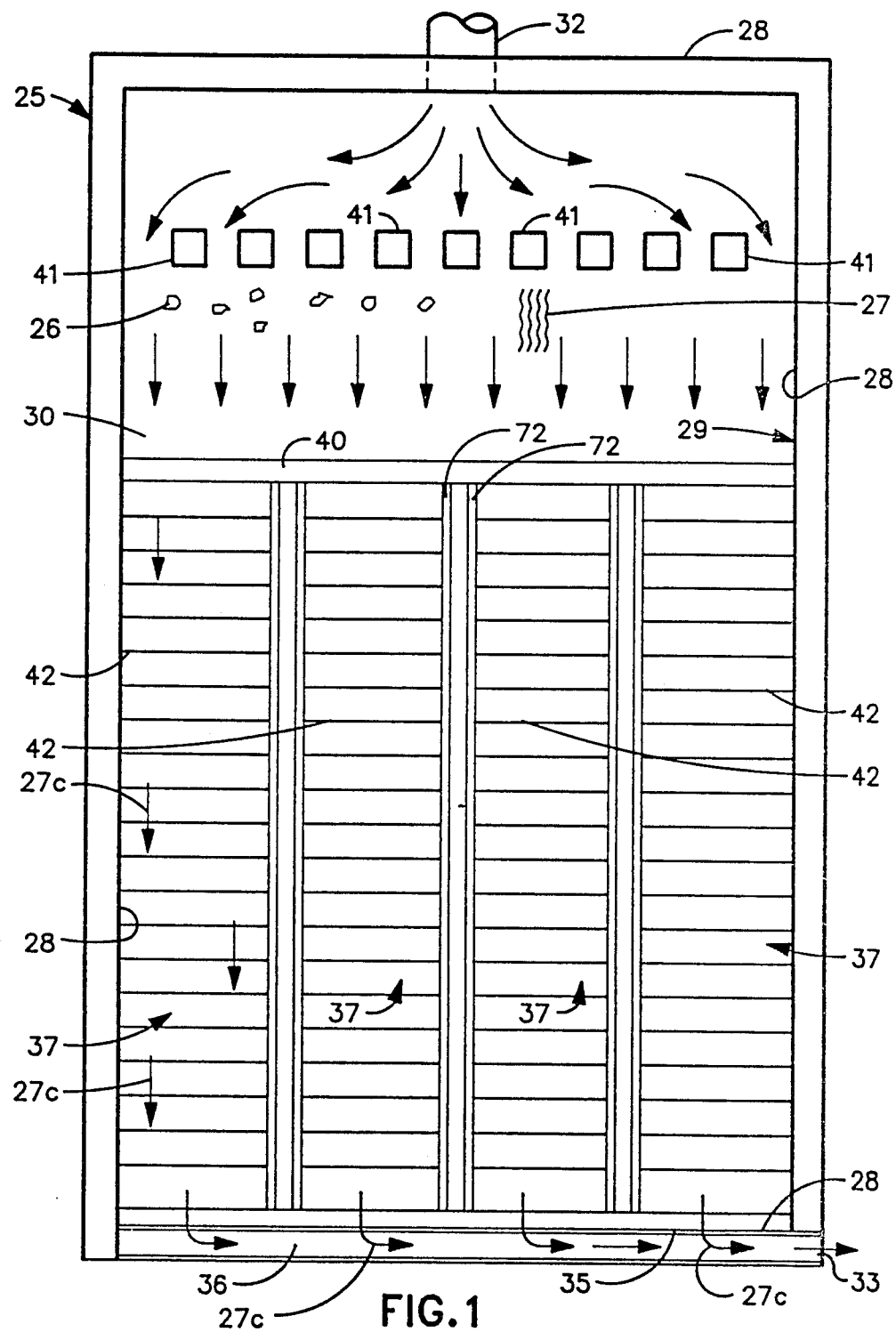
FIG. 1 is a plan view of a detention basin showing four separate clarifier sections, wherein each section includes inclined parallel lamina that form quiescent zones through which liquid to be clarified flows, each section further including a deck that covers the detention basin for controlling liquid flow through such zones.
Figure 2:
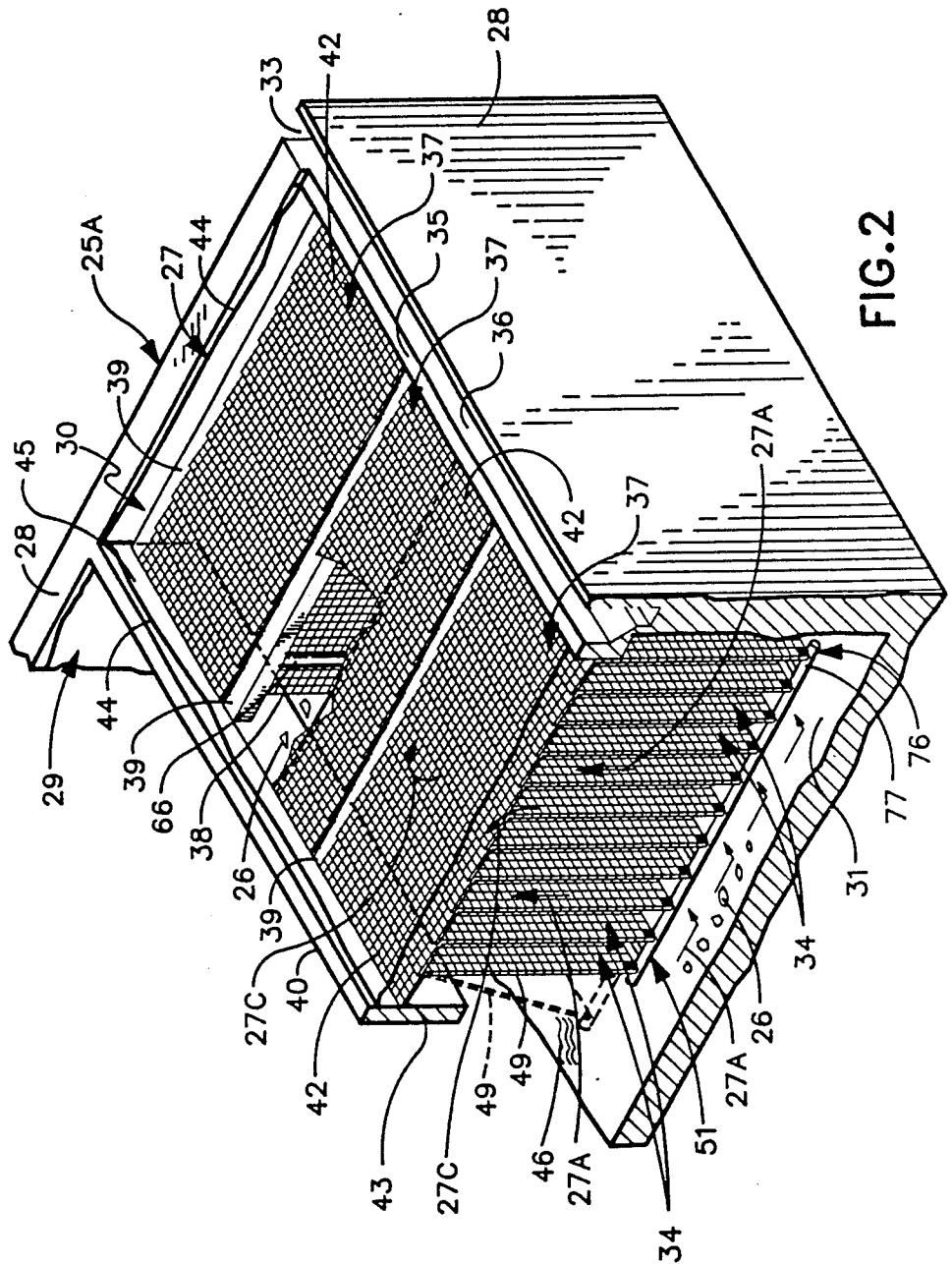
FIG. 2 is a perspective view of three of the clarifier sections shown in FIG. 1 in which a cross baffle causes solid-laden liquid to flow under the lamina into the quiescent zones.

Referring to FIG. 1, a clarifier 25 is shown for removing materials such as solids 26 from liquid 27. The clarifier 25 is shown including vertical outer walls 28 which define a detention basin 29 having an open top 30 (FIGS. 2 and 3A) and a bottom 31 (FIG. 2). One embodiment of the clarifier 25 is shown in FIG. 1 and is referred to as a rectangular clarifier 25A (FIG. 2). Another embodiment of the clarifier 25 is shown in FIGS. 13–18 and is referred to as a circular clarifier 25B. The clarifier 25 may have other shapes, such as square, and be used with the present invention. References to the clarifier 25 apply to all embodiments of the clarifier.

Figure 3A:
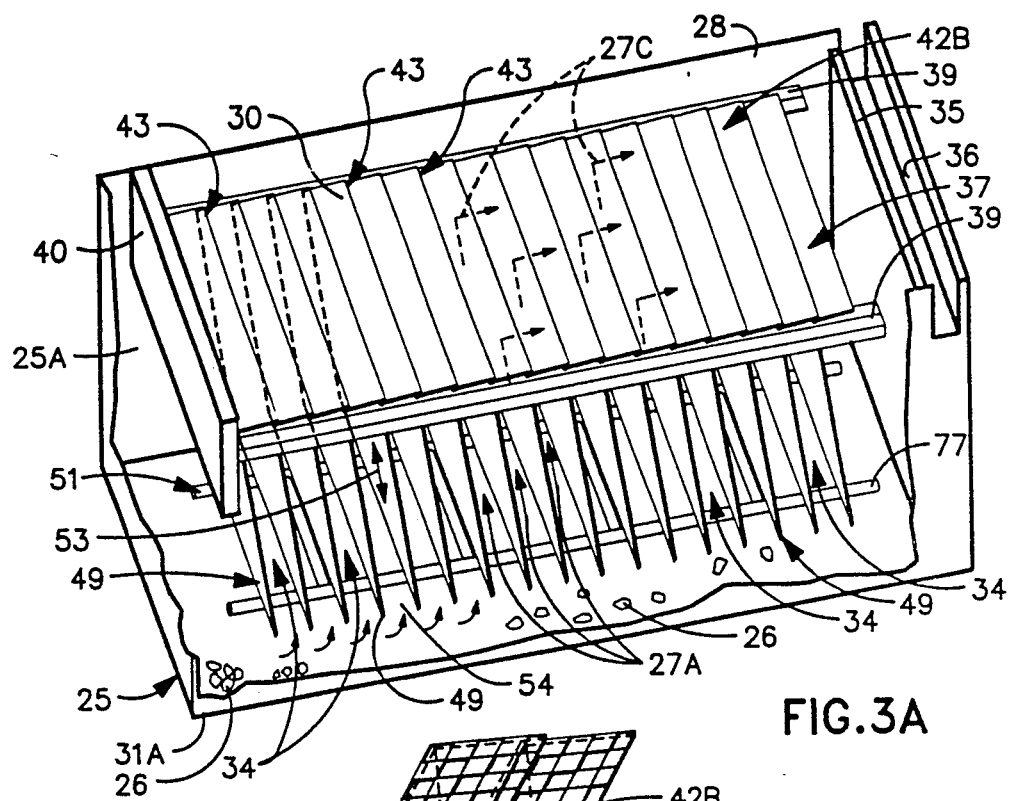
FIG. 3A is a perspective view of a preferred embodiment of the present invention showing one section of the deck shown in FIG. 2, wherein the inclined parallel lamina are shown hanging from the deck and connected to a submerged adjustment mechanism.

Referring also to FIGS. 2 and 3A, as the liquid 27 and the solids 26 flow through the detention basin 29 from an inlet 32 (FIG. 1) to an outlet 33 (FIGS. 1 and 2), the flow of the liquid 27 and the solids 26 is substantially reduced according to the principles of the present invention to form many very low flow rate, or quiescent, zones 34 in the clarifier 25. The liquid 27 and the solids 26 flow upwardly (see liquid/solids flow arrows 27A in FIGS. 2, 3A and 3B, for example) in the quiescent zones 34 so that the solids 26 settle out of the liquid 27 and the resulting clarified liquid (represented by arrows 27C in FIGS. 1, 4B and 5B), flows to the outlets 33 of the clarifier 25. These outlets 33 may be in the form of weirs 35 that lead to troughs 36.

Figure 5A:
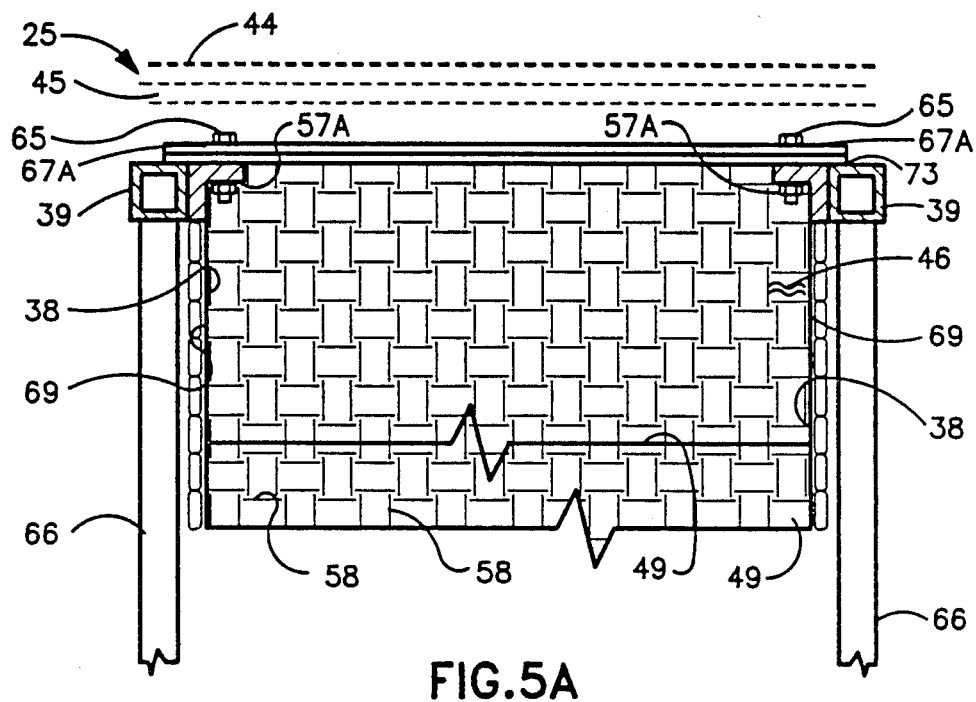
FIG. 5A is an end elevational view of the two adjacent flap members shown in FIG. 4A, with the rearward flap member being in the closed position.

As shown in FIG. 1, the detention basin 29 is divided into a number of sections 37. Referring to FIGS. 2 and 5A, vertical internal partitions 38 define the center sections 37 and one partition 38 and one wall 28 define the outer sections 37. The internal partitions 38 extend downwardly from beams 39 which extend along the length of the detention basin 29 between one of the opposite outer walls 28 and a cross baffle 40. As shown in FIG. 1, the liquid 27 and the solids 26 suspended therein flow into the detention basin 29 and are spread out by barriers 41. As shown in FIGS. 1 and 2, they flow along the bottom 31 toward the cross baffle 40. The cross baffle 40 prevents the liquid 27 and the solids 26 from flowing over the clarifier sections 37 without flowing through those sections 37. As shown in FIG. 2, the liquid 27 and the suspended solids 26 spread out across the bottom 31 and flow underneath and upwardly into the sections 37 of the detention basin 29 as indicated by the liquid/solid flow arrows 27A.

Planar Flow Control Deck 42

Figure 4B:
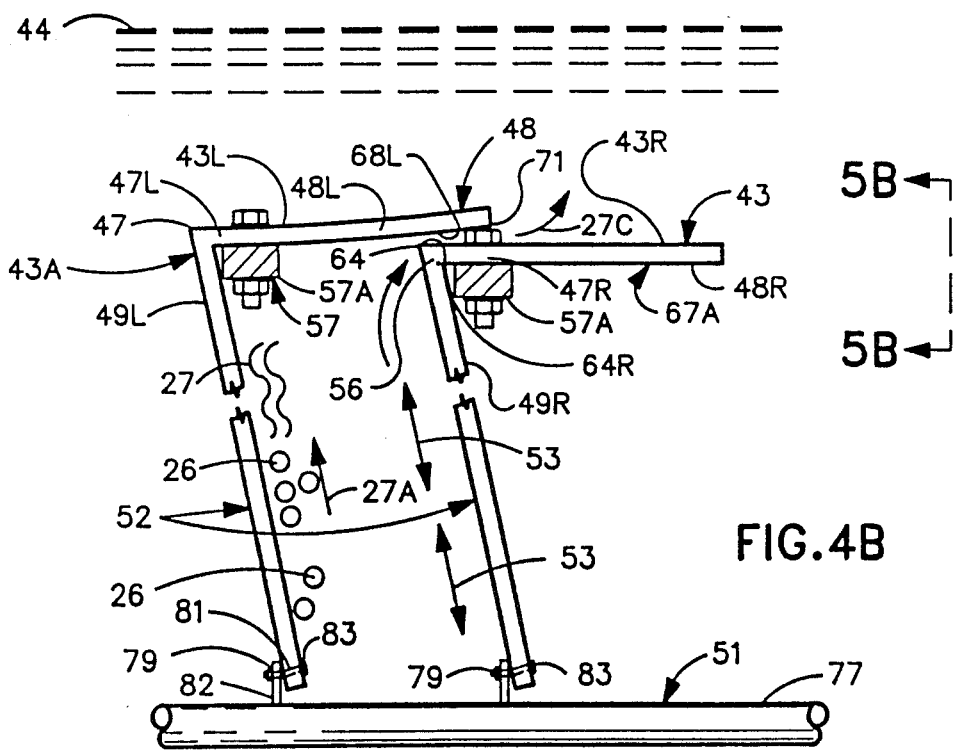
Figure 5B:
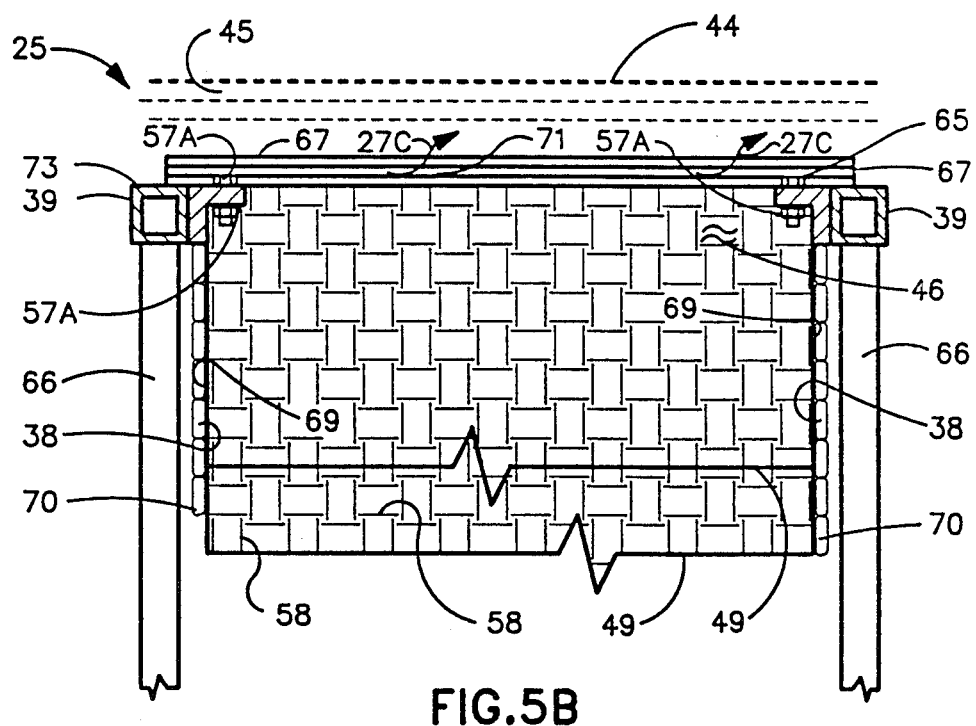
FIG. 5B is an end elevational view of the two adjacent flap members shown in FIG. 4B, with the rearward member being in the open position, showing a gap formed between the adjacent flap members in response to the upward flow of the liquid through the quiescent zone.

For clarifying the liquid 27, a planar flow control deck 42 is shown in FIGS. 1 and 2 extending across each section 37 of the detention basin 29. The deck 42 is formed from a plurality of elongated flap members 43, shown in FIGS. 3A, 3B, 3C, for example. The planar deck 42 is supported beneath the upper surface 44 of the liquid 27 for dividing the liquid 27 into upper and lower layers 45 and 46, respectively (FIGS. 5A and 5B). As shown in greater detail in FIG. 4B, one edge 47 of each such flap member 43 is fixed and an opposite or free edge 48 thereof is in releasable sealing engagement with an adjacent flap member. To distinguish the left flap member (FIG. 4B) from the adjacent flap member, when the relationship between flap members is noted, the left flap member is referred to as 43L and the adjacent flap member is referred to as 43R. The free edge 48 of each such flap member 43L is movable out of engagement with such adjacent flap member 43R in response to the upward flow of the liquid 27 in the clarifier 25 as represented by the liquid/solids flow arrows 27A in FIG. 4B.

Adjustable Lamina 49

Figure 3B:
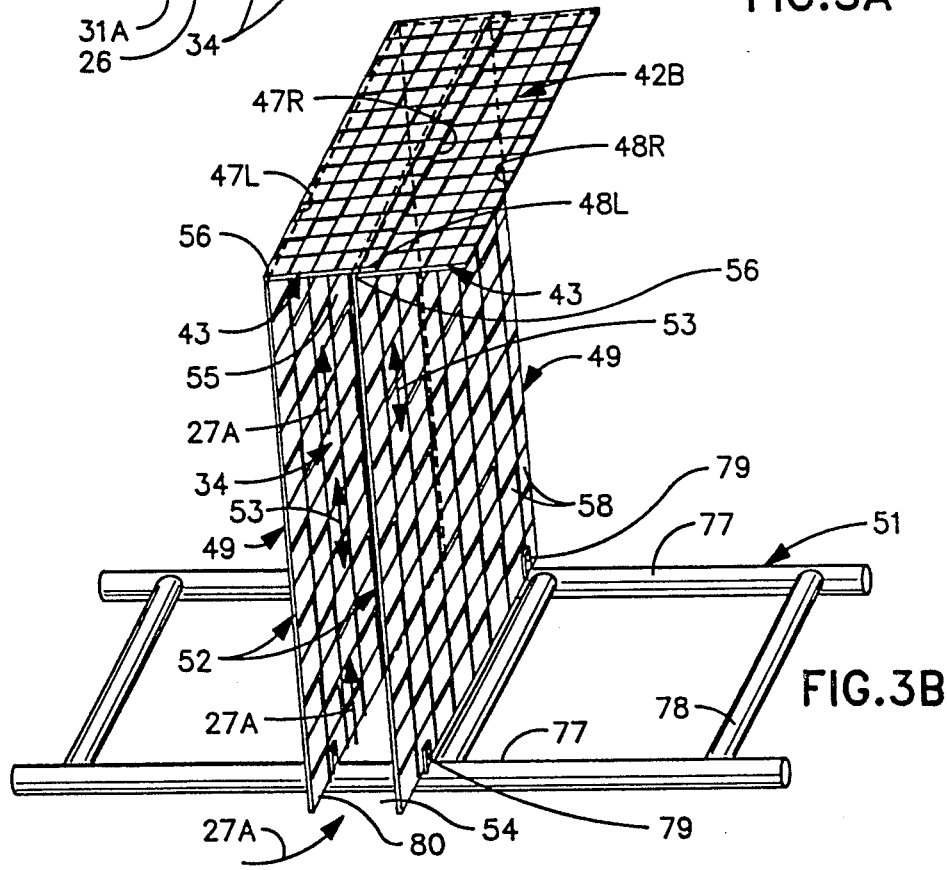
FIG. 3B is an enlarged portion of FIG. 3A showing two of the parallel lamina each having a flap member that overlaps the flap member of an adjacent lamina.
Figure 3C:
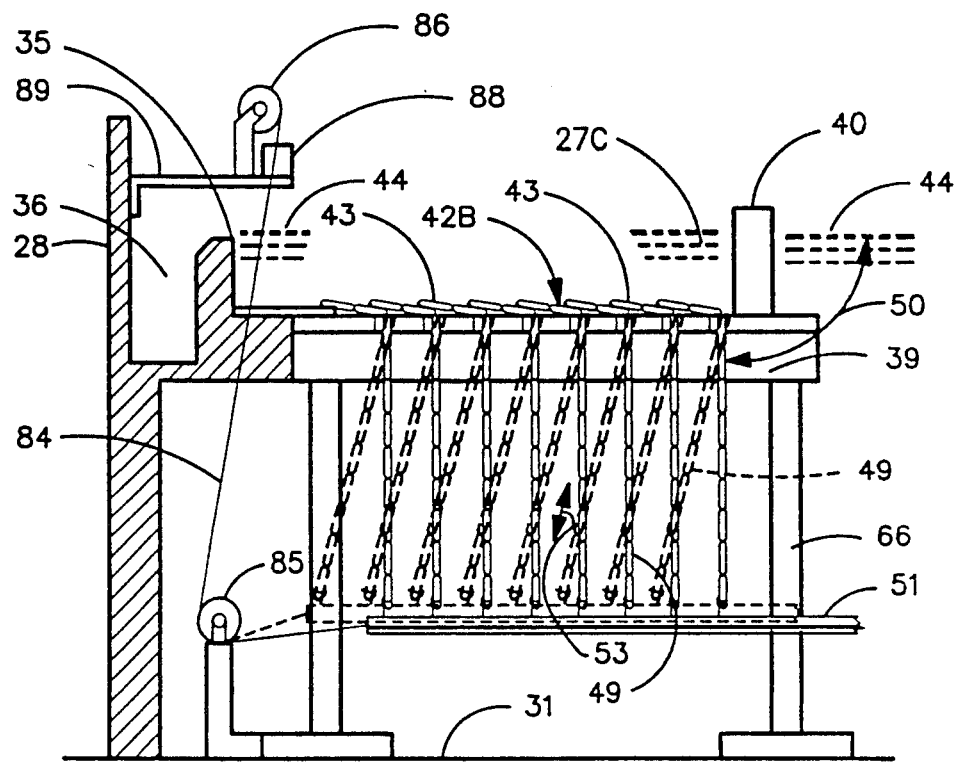
FIG. 3C is an enlarged portion of FIG. 3A shown as a side elevational view showing the submerged mechanism connected to two of the parallel lamina for changing, in tandem, the angle of inclination of the parallel lamina.
Figure 6:
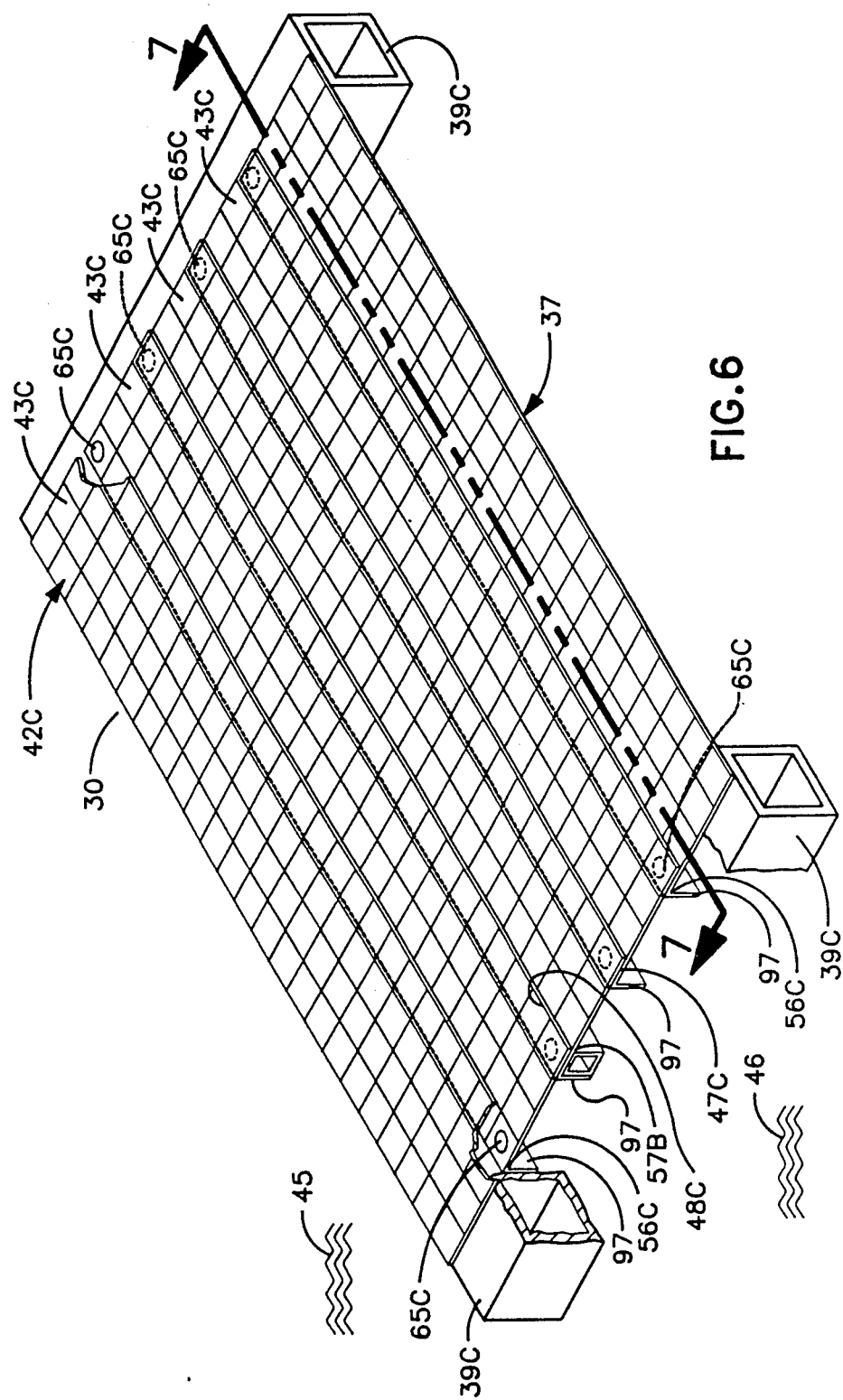
FIG. 6 is a perspective view of one section of the detention basin showing a portion of one embodiment of the flow control deck without the depending parallel lamina, wherein beams are shown for supporting the fixed edge of the flap members.

Referring to FIGS. 3A through 3C, each section 37 of the detention basin 29 is also provided with flexible, inclined lamina 49 that define the quiescent zones 34 to assist in reducing the rate of upward liquid flow so that the solids 26 carried by the liquid 27 settle and are separated from the liquid 27. The lamina 49 are suspended in parallel relationship, with the angle 50 (FIG. 3C) at which the lamina 49 are inclined relative to the liquid surface 44 being adjustable by a submerged adjustment mechanism 51. Adjacent pairs or sets 52 (see joined arrows in FIG. 3B) of the parallel lamina 49 define the quiescent zones 34, which are effective as separate inclined settling channels (indicated by double arrow 53). Each channel 53 is open at the bottom 54 to receive the liquid 27 that is laden with the solids 26. The top 55 of each channel 53 is releasably closed by one of the flap members 43. Each flap member 43 extends horizontally from a vertex 56 (FIGS. 3B, 5A and 5B) adjacent the top 55 of the channel 53 across the respective section 37. Each lamina 49 is supported at the vertex 56 by a bracket 57, such as an angle bracket 57A (FIG. 5A) or a beam-type bracket 57B (FIG. 6). In this manner, the flap member 43 is free to flex or otherwise allow the free edge 48 to move vertically in response to the upward flow 27A of the liquid 27 in the settling channel 53. The flap members 43 combine to form the flow control deck 42 that promotes uniform liquid flow through all of the settling channels 53.

Figure 10A:
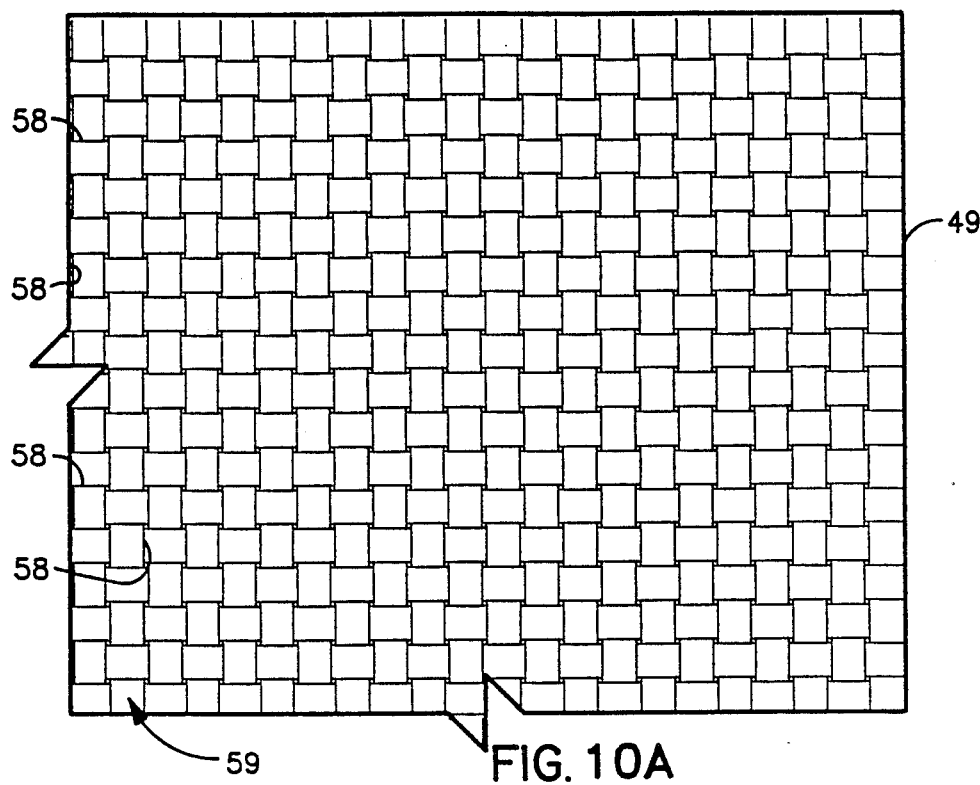
Figure 10B:
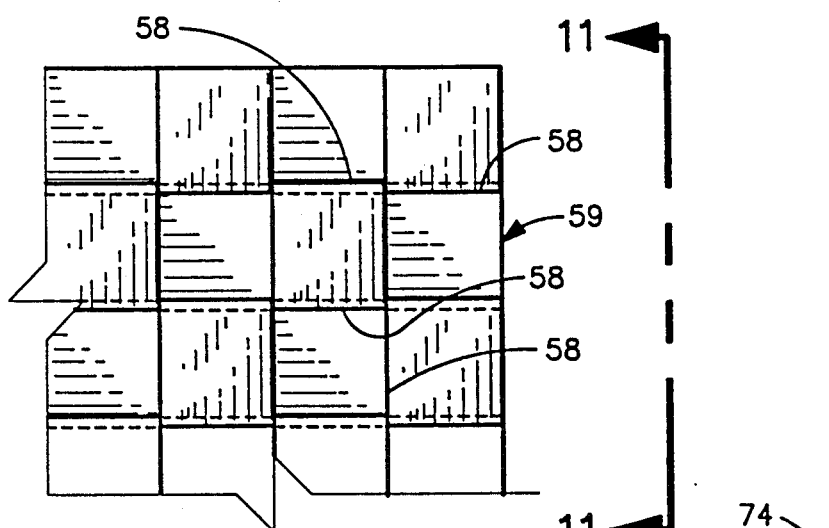
Figure 11:
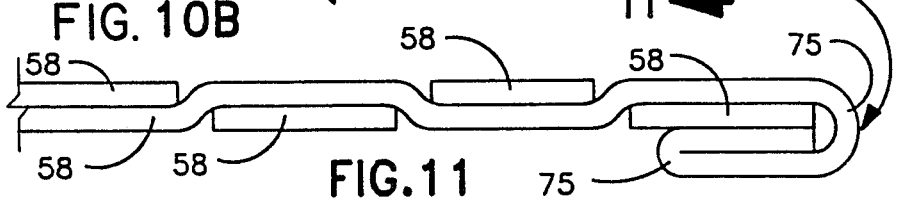
FIG. 11 is a cross-sectional view taken along line 11—11 in FIG. 10B showing the strips of the woven lamina.

In the preferred embodiment of the invention, each lamina 49 and each partition 38 is constructed of woven strips 58 of steel or plastic (FIGS. 10 and 11). Also, the submerged mechanism 51 changes the angle 50 (FIG. 3C) of inclination of the lamina 49 to maximize settlement. The lamina 49 are secured to (but may be detached from) the adjustment mechanism 51 to permit removal for cleaning. Additionally, the adjustment mechanism 51 may be vibrated to promote settlement of the solids 26 or may be moved vertically to buckle or flex the lamina 49 to clean the lamina 49 without removing the lamina 49 from the basin 29.

Clarification Methods

One embodiment of the method of the present invention clarifies the liquid 27 by separating the suspended solids 26 from the liquid 27. The method includes the steps of dividing the detention basin 29 into a plurality of generally vertical flow paths represented by the liquid/solids flow arrow 27A and defined by the channels 53. The next step releasably closes the top 55 of each of the flow paths 27A. The liquid 27 and the solids 26 are then supplied to the basin 29 at a pressure that causes the liquid 27 to open each of the releasably closed flow paths 27A so that the clarified liquid 27C (FIG. 5B) exits the basin 29 while the liquid flow rate is sufficiently low and uniform in the flow paths 27A to permit the solids 26 to settle in the flow paths 27A and to the bottom 31 of the detention basin 29.

Another embodiment of the method of the present invention for separating the settleable solids 26 from the liquid 27 includes the steps of containing the liquid 27 and the solids 26 in the detention basin 29 and providing a plurality of the parallel lamina 49 extending in such basin 29 at the angle 50 (FIG. 3C) relative to the surface 44 of the liquid 27 in the basin 29 for defining the separate liquid flow channels 53. The lamina 49 are moved to change the angle 50 thereof according to the settling characteristics of the solids 26 suspended in the liquid 27 and the desired operational characteristics of the clarifier 25A. When the lamina 49 are sheets 59 woven from the strips 58 (FIGS. 10 and 11) that are suspended in the basin 29, the movement of the sheets 59 is such as to cause them to buckle to remove the solids 26 therefrom.

Circular Clarifier 25B

Referring to FIGS. 13 through 18, the circular clarifier 25B is shown for removing the solids 26 from the liquid 27. The circular clarifier 25B is shown including a central cylindrical wall 60 and the inlet 32B. The liquid 27 and the solids 26 flow upwardly and out of the inlet 32B and then to and along the bottom 31B of the circular retention basin 29B for flow radially outward toward an intermediate partition 61. The intermediate partition 61 has a much larger diameter than that of the central wall 60 to define the inner side of an annular clarifier section 62. An outer cylindrical wall 63 (FIG. 14) defines the other side of the annular clarifier section 62.

Annular Flow Control Deck 42B

In a second embodiment of the present invention, the planar flow control deck 42B is mounted within the annular clarifier section 62 of the circular clarifier 25B. To distinguish from the first embodiment of the invention shown in FIGS. 1 through 5B, the structure of the first embodiment that is common to the second circular embodiment is referred to using the same reference numbers plus the letter "B". Thus, the deck in the annular clarifier section 62 is referred to as the annular flow control deck 42B. This annular deck 42B is also formed from the plurality of elongated, flap members 43B. As shown in greater detail in FIG. 15, each of the flap members 43B has the two opposing, fixed and free edges 47B and 48B, respectively, and is generally the same as the flap members 43 shown in FIGS. 2, 3A and 3B. In particular, the fixed edge 47B of the flap member 43B is fixed and the opposite, free edge 48B thereof is in releasable sealing engagement with the adjacent flap member 43BR. Thus, the opposite edge 48BL of each flap member 43B of the annular deck 42B is free to move out of sealing engagement with the adjacent flap member 43BR in response to the upward flow 27B of the liquid 27 from the bottom 31B of the circular detention basin (29B FIG. 14).

Adjustable Lamina 49B for Circular Clarifier 25B

Still referring to FIGS. 13 through 18, when the quiescent zones 34 are to be formed in the circular clarifier 25B, that clarifier 25B is also provided with the flexible, inclined lamina 49, referred to as the lamina 49B. The quiescent zones are referred to as the zones 34B and assist in reducing the upward liquid flow 27B so that the solids 26 carried by the liquid 27 settle and are separated from the liquid 27. The lamina 49B are suspended in parallel relationship, with the angle 50B (FIG. 15) at which the lamina 49B are inclined being adjustable under the control of a submerged annular adjustment mechanism 51B. The adjacent pairs or sets 52B of the parallel lamina 49B form the quiescent zones 34B, which are effective as the separate inclined settling channels (shown by dual arrows 53B). The flap members 43B of the annular flow control deck 42B function in a manner similar to the flap members 43 of the planar flow control deck 42 for promoting uniform flow of liquid 27B through all of the settling channels 53B.

First Embodiment of Planar Flow Control Deck 42

Referring to FIGS. 1, 2, 3A, 3B, 3C, 4A, 4B, 5A and 5B, the first embodiment of the planar flow control deck 42 is shown. In this embodiment, each flap member 43 of the deck 42 is formed integrally with one of the lamina 49. In particular, in the first embodiment the planar flow control deck 42 extends across at least a part of the detention basin 29, which is shown as one of the sections 37. The section 37 is shown generally rectangular in plan view, although other shapes may be provided, such as square (not shown) or circular as in the second embodiment shown in FIGS. 13 through 18. As shown in FIGS. 3A and 3B, the first embodiment of the control deck 42 is formed from the plurality of flap members 43. As shown in detail in FIGS. 3B, 4A and 4B, each of the flap members 43 is sheet-like, elongated and has the fixed edge 47 and the opposing free edge 48. The fixed edge 47 of each flap member 43 is defined as that portion of the right (or adjacent) flap member 43R that extends from the vertex 56 along a surface 64 that is overlapped by the free edge 48L of the left flap member 43L. The fixed edge 47R is shown secured as by flat head bolts 65 to the brackets 57A.

Figure 4A:
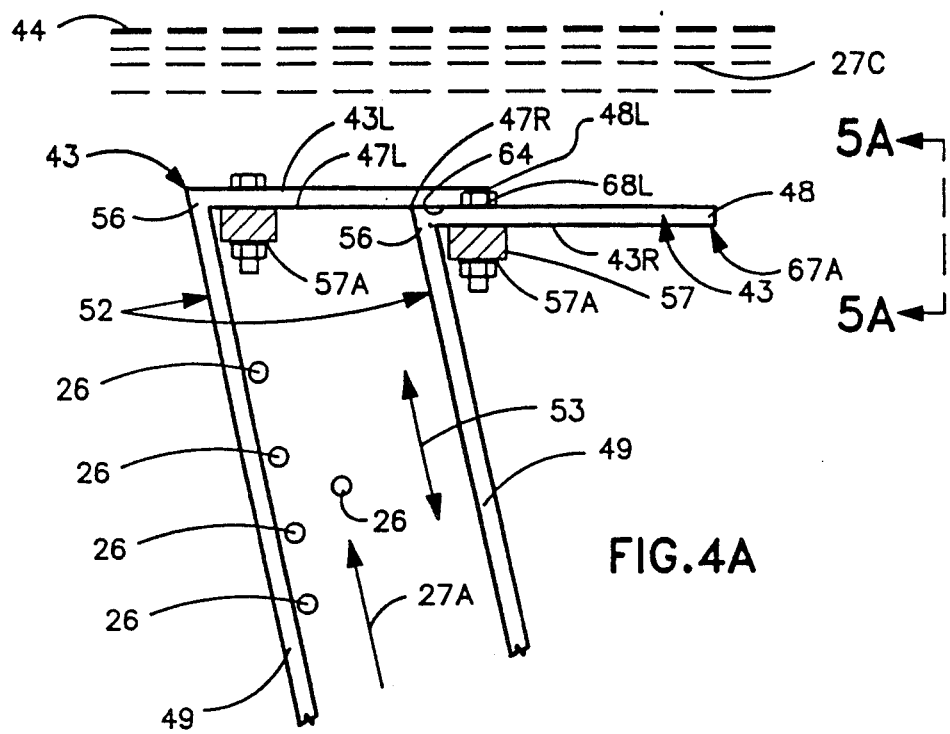

Referring to FIGS. 5A and 5B, the brackets 57A are shown extending horizontally partially across the section 37 of the detention basin 29. Still referring to FIGS. 5A and 5B, it may be understood that each bracket 57A is supported on one of the beams 39 that extend the length of the clarifier 25 from the cross baffle 40 to the end wall 28 adjacent the trough 36. Each beam 39 is supported on a post 66 that rests on the bottom 31 of the detention basin 29. Each bracket 57A is in the form of a short, rigid beam secured to its respective end 67 of the flap member 43. The fixed edge 47 of each flap member 43 is bolted at the ends 67 to the opposed brackets 57A so that each flap member 43 is taut and extends horizontally as shown in FIG. 5A, for example. With the fixed edge 47L secured in this manner, as shown in FIGS. 4A and 4B the free edge 48L of each flap member 43 is cantilevered so that it extends over the overlapped surface 64 to form an overlapping surface 67A. In this manner, in the absence of force from the upward flow 27A of the liquid 27, the free edges 48L of the left flap members 43L are in releasable sealing engagement with the adjacent fixed edges 47R of the right, adjacent flap member 43R. As shown in FIG. 4A, a releasable sealing engagement results from the overlapping of the left flap member 43L with respect to the right flap member 43R. In particular, the free edge 48L of the left flap member 43L extends over the fixed edge 47R of the right flap member 43R to form the opposed, overlapping and overlapped, flat surfaces 68L and 64R, respectively, that are effective to seal or close the top 55 of the settling channel 53.

The position of the respective adjacent left and right flap members 43L and 43R shown in FIG. 4A is referred to as the closed position. As shown in FIGS. 5A and 5B, opposite, generally vertically extending edges 69 of each lamina 49 are positioned in close proximity to the partitions 38 that are in the form of baffles 70 that are bolted to and hung from the beams 39. As shown in FIG. 2, the baffler 70 extend the length of the basin 29 in the direction of the beams 39. The baffles 70 may also be formed from the woven sheets 59. The center settling channels 53 are formed between the respective adjacent left and right lamina 49 (the pairs 52) and between the baffles 70 that are adjacent the opposite edges 69 (FIG. 5A) of each pair 52 of the lamina 49. The settling channels 53 along the walls 28 of the basin 29 are formed between one of the walls 28, one of the baffles 70 and the pair 52 of lamina 49. Furthr, the ends 67 of the flap members 43 extend over the beams 39 such that the clarified liquid 27C (shown by the arrows 27C in FIG. 4B) will not flow out of the top 55 of the channel 53 when the left flap member 43L is in the closed position shown in FIG. 4A in releasable sealing engagement with the right flap member 43R.

As shown in FIG. 4B, the free edge 48L of the left flap member 43L is free to move out of the releasable sealing engagement with the fixed edge 47R of the right adjacent flap member 43R in response to the force of the upwardly flowing liquid 27 within the settling channel 53. The position of the free edge 48L of the left flap member 43L shown in FIG. 4B is referred to as the open position. In the open position, and as further shown in FIG. 5B, the left flap member 43L has flexed to provide a gap or opening 71 between the overlapping surface 68L of the left flap member 43L and the overlapped surface 64 of the right flap member 43R. As shown in FIG. 5B, this gap is generally rectangular and results in the free edge 48L being spaced from the fixed edge 47R of the right flap member 43R. In the preferred embodiment of the first embodiment shown in FIGS. 1, 2, 3A, 3B, 4A, 4B, 5A and 5B, the pairs 52 of the lamina 49 are spaced apart by two to four inches and the length of the lamina 49 across each section 37 is from three to six feet. The flap members 43 have a length (from left to right in FIGS. 4A and 4B) of about four inches and the surfaces 64 and 68L overlap about one inch. In the first embodiment, with the flap members 43 formed integrally with the lamina 49 and formed from the sheet 59 of woven stainless steel strips 58, the gap 71 opens to about 0.030 inch in the vertical direction in FIGS. 4A and 4B. The upward movement of the free edge 48L may be limited by a plate 72 (FIG. 1) secured to the top 73 (FIG. 5A) of each beam 39 and that extends over part of the ends 67 of the flap members 43. The plates 72 limit the cross-sectional area of the gap 71.

Referring to FIG. 5B, it may be understood that for the section 37 adjacent the right side wall 28 (FIG. 1), that the wall 28 supports the bracket 57A. In a similar manner, one of the brackets 57A is secured to the left wall 28 (FIG. 1).

As shown by the arrows 27C in FIGS. 3A and 4B, the clarified liquid 27C flows through the gaps 71 when the flap members 43 are in the open position. The clarified liquid 27C then flows into the upper liquid layer 45 above the deck 42 and flows generally from left to right in FIG. 2 within a given section 37 to the right end of the section 37 where it exits the detention basin 29 via the trough 36.

Referring to FIGS. 2 and 3A, it may be understood that the various flap members 43 and the supporting brackets 57A mount the planar flow control deck 42 so that it extends completely across the length and width of a particular section 37 of the detention basin 29 and is under the upper surface 44 of the liquid 27 to divide the liquid 27 into the layers 45 and 46. The structure of the deck 42 also provides a safety feature since the deck 42 prevents objects, people, etc. from falling into the detention basin 29.

Adjustable Lamina 49

As indicated above, the first embodiment of the flow control deck 42 includes one of the lamina 49 formed integrally with one of the flap members 43. Alternative ways of joining the lamina 49 to the flap members 43 can be provided, such as by using a hinge (not shown) at the vertex 56 and a coil spring 43S (FIG. 20A) for biasing the left flap members 43L downwardly onto the right flap members 43R.

In the first embodiment, the respective integral flap member 43 and lamina 49 may be formed by bending the thin, sheet 59 of stainless steel strips 58 into the generally reversed-seven-shape (or generally upside down "L" shape) shown in FIGS. 3A, 3B, 4A, 4B, 5A and 5B. Such bending forms the vertex 56 at which the fixed edge 47 of the flap member 43 is supported. Alternatively, the integral lamina 49 and flap members 43 may be bent into the generally seven-shape shown in FIGS. 2 and 3C. In either version of the integral lamina 49 and flap member 43, each lamina 49 extends downwardly from its vertex 56 in a generally vertical, but inclined, direction. As shown in FIGS. 3A, 3B, 4A and 4B, for example, the various lamina 49 extend downwardly in parallel relationship to each other. Each lamina 49 extends to a depth spaced from the bottom 31 of the detention basin 29 so that the liquid 27 and the solids 26 flowing along the bottom 31 from the inlet 32 flow upwardly into the settling channel 53 formed between the pairs 52 of the lamina 49.

As described above, each channel 53 is formed in part by the adjacent relationship of the baffles 70 (FIG. 5B) on each side 69 of the lamina 49. As also noted above, in the first embodiment of the invention, the integral lamina 49 and the flap members 43 are constructed from woven stainless steel sheets 59 shown in FIGS. 5B, 10 and 11, for example. The thin and flexible nature of the sheets 59 is particularly suited for the functions of the integral lamina 49 and flap members 43 since a single sheet 59 of the strips 58 of woven stainless steel material can be bent at the vertex 56 to resemble the inverted "L" or reversed seven-shape (FIGS. 3A and 3B) or the seven-shape (FIG. 3C) thereby forming both the woven lamina 49 and the flap member 43 integral therewith. Moreover, the flexible nature of the woven stainless strips 58 provides the resilient, spring-like characteristic of the flap members 43 that is necessary to provide the releasable sealing engagement between the overlapping surfaces 68L and the overlapped surfaces 64R. In particular, the woven stainless steel strips 58 that form the first embodiment of each lamina 49 and flap member 43 have a width of one to two inches and a thickness of 0.005 inches. These strips 58 are formed by slitting a large roll of sheet material using a standard sheet metal slitter. Referring to FIGS. 10 and 11, the strips 58 are woven such that the woof (or vertical) strips 58 (FIGS. 10A and 10B) are tightly arranged so as to touch each other. The other strips 58 form the warp (or horizontal) part of the woven sheet 59 and are spaced apart by about 0.1 to 0.2 inches as shown in FIG. 10B. For ease of illustration of the weave, in FIG. 10, the woof strips 58 are shown spaced, whereas in FIG. 11 they are shown abutted as described above. Despite such spacing, the sheets 59 are effective in operation to direct the liquid/solid flow 27A along the channels 53 and to withstand the pressure in the channels 53. As shown in detail in FIG. 11, to promote safe handling the perimeter edges 74 of each lamina 49 formed from the woven stainless steel strips 58 are formed by bending the strips 58 twice onto themselves so that only rounded surfaces 75 are exposed.

When the woven sheets 59 are used for the baffles 70, the warp and woof strips 58 are reversed to provide the horizontal strips 58 tightly arranged.

In the first embodiment, the lamina 49 have a somewhat lesser width than the flap members 43 (FIGS. 5A and 5B) and hang from the vertex 56 about two to ten feet. These various dimensions of the flap members 43 and the lamina 49 will vary in actual installations according to the liquid 27, the solids 26 and the flow conditions.

The lamina 49 formed from such woven stainless steel sheets 59 hang in tension from the respective brackets 57A located at the vertices 56 of the lamina 49. With the lamina 49 thus in tension resulting from being supported along the fixed edges 47, the lamina 49 may be relatively thin and need not be supported along the other edges 69 thereof that are adjacent to the vertical baffles 70 nor at the bottom 80 of the lamina 49.

The lamina 49 may be rolled up into relatively small diameter cylinders that can be inserted through openings (not shown) in covers (not shown) of the clarifier 25A. This facilitates clarifier installation where removal of such covers is undesirable.

As described with respect to FIGS. 5A and 5B, the channels 53 are defined by the pairs 52 of lamina 49 (shown as 49L and 49R in FIG. 4B), the baffles 70 on opposite sides of the lamina 49 and the flap members 43 at the tops 55 of the channels 53. With the left flap member 43 in the closed position shown in FIG. 4A, the force of the liquid 27 and the solids 26 tending to flow upwardly in the channel 53 is exerted on the lamina 49, the baffles 70 and the flap members 43. This force overcomes the weight of the flap member 43 plus the force of the flap member 43 that tends to keep it in the closed position. The force of the liquid 27 is sufficient to flex the flap members 43 so that the free edges 48 move into the open position shown in FIG. 4B, where the free edge 48L is shown flexed and the free edge 48R (which is not shown as part of a channel 53 under the flap member 43R) is not flexed. The force required to flex the flap members 43 is linear with respect to the amount of the gap 71, e.g., force=k times the amount of the gap 71. As noted above, the solids 26 are often disturbed by random movements of the liquid 27 within the clarifier 25A. These random movements are caused by temperature gradients, surface disturbances and channelling currents within the clarifier 25A. These random movements of the liquid 27 vary the pressure in each channel 53 by an amount of about two to five percent. Thus, the random forces exerted on the flap members 43 are about two to five percent of the force of the liquid 27 that flexes the flap members 43. These random forces are not effective to vary the amount of the gap 71 to any appreciable extent, such that the rate of the flow of the clarifier liquid 27C (FIG. 4B) through the gaps 71 does not vary appreciably in response to the random forces. As a result, the rate of flow of the clarified liquid 27C (FIG. 4B) through all of the channels 53 tends to be equal. In this manner, with the lamina 49 being parallel and set at the same angle 50 (FIG. 3C), the solids 26 in each channel 53 tend to settle at similar or uniform rates. If the influent liquid 27 and the influent solids 26 suspended therein have been uniformly mixed before entering the bottom 54 of the channels 53, the uniform rates of settling tend to result in uniformly clear clarified liquid 27C flowing from the top 55 of each of the channels 53.

If in the operation of the clarifier 25A there are substantially different pressures in different ones of the channels 53, such that very different forces are applied to the different flap members 43 of different channels 53, the linear force-gap relationship of the flap members 43 can be made non-linear by providing the spring 43S as non-linear spring above each free edge 48. In this manner, as the upward force of the liquid 27 on the flap member 43 increases, the resulting incremental flexure of the flap member 43 will be less so that the incremental increase in the amount of the gap 71 will be less, which will further tend to equalize the rates of flow of the clarified liquid 27C from the various channels 53 into the upper liquid layer 45.

Adjustment Mechanism 51

In the first embodiment of the invention shown in FIGS. 2 and 3A through 3C, each respective lamina 49 is connected to the submerged mechanism 51 that is effective to vary in tandem the angle 50 (FIG. 3C) at which the parallel lamina 49 hang from the brackets 57A (FIG. 5A). Such adjustment of the angular position of the parallel lamina 49 with respect to the surface 44 of the liquid 27 in the detention basin 29 enables the clarifier 25A to function as desired despite, for example, variations in the liquid 27 or the solids 26 that are introduced into the detention basin 29. Further, in the design of clarifiers, such as the clarifier 25A, it is difficult to anticipate the exact angle 50 (FIG. 3C) at which the lamina 49 should be installed. Larger angles 50 reduce the distance that the solids 26 have to fall or settle before they come to rest on the lamina 49. Smaller angles 50° (to 90°) tend to cause the solids 26 that settle onto the lamina 49 to continue to move downwardly in the chamber 53 and settle to the bottom 31 of the basin 29 for removal. Thus, one design goal is to maximize the amount of the solids 26 that settle onto the lamina 49, but a conflicting goal is to maximize the amount of solids 26 that settle to the bottom 31 of the detention basin 29. The adjustment mechanism 51 allows both design goals to be achieved.

Referring now in detail to FIGS. 3A through 3C, it is recognized first that the flap members 43 in FIG. 3C are seven-shaped and incline to the left, whereas the flap members 43 in FIGS. 3A and 3B are reverse-seven-shaped and incline to the right. The lamina adjustment mechanism 51 is shown in each case including a ladder-like structure 76 having parallel beams 77 that extend in the major direction of each section 37 of the detention basin 29. Cross pieces or rungs 78 of the ladder-like structure 76 extend in the minor direction of each section 37 between and are secured to the beams 77. Each beam 77 is provided with a series of tabs 79. The tabs 79 connect each beam 77 to a bottom edge 80 of each lamina 49. Referring to FIG. 4B, such connection between the tab 79 and the bottom edge 80 of each lamina 49 is preferably by providing appropriately spaced apertures 81 and 82 in such respective bottom edge 80 and in each tab 79 and providing a flexible bolt 83 in the apertures 81 and 82 such that the tabs 79 can move relative to the lamina 49.

As shown in detail in FIG. 3C, the lamina adjustment mechanism 51, including the beams 77 and the rungs 78, is effectively suspended on and thus supported vertically by the lamina 49. The lamina 49 tend to hang vertically from the brackets 57A but are moved into the inclined positions shown in FIGS. 3A and 3C, for example, upon movement of the beams 77, which is to the left in FIG. 3A and to the right in FIG. 3C. Such movement of the beams 77 is effective to swing each lamina 49 around the vertex 56 such that the beams 77 move upwardly as they swing to increase the inclination angle 50. The left-right movement of the lamina adjustment mechanism 51 is controlled in a selective manner by a metal tape 84 that is attached to the leftmost rung 78 in FIG. 3C or the rightmost rung in FIG. 3B. The metal tape 84 extends around a pulley 85 and then upwardly to a winch 86 having a motor that can be accurately stepped to incrementally wind or unwind the metal tape 84 by selected lengths so that the left to right positioning of the beam 77 can be selected.

Limit switches (not shown) can also be used to control the winch 86 so as to incrementally wind or unwind the tape 84 on the winch 86. Also, a squeegee or wiper 87 (FIG. 12) is provided for cleaning the tape 84. In a preferred embodiment of the lamina adjustment mechanism 51, the metal tape 84 is formed from a thin strip of stainless steel, having a width of one to two inches and a thickness of 0.005 inches.

Figure 12:
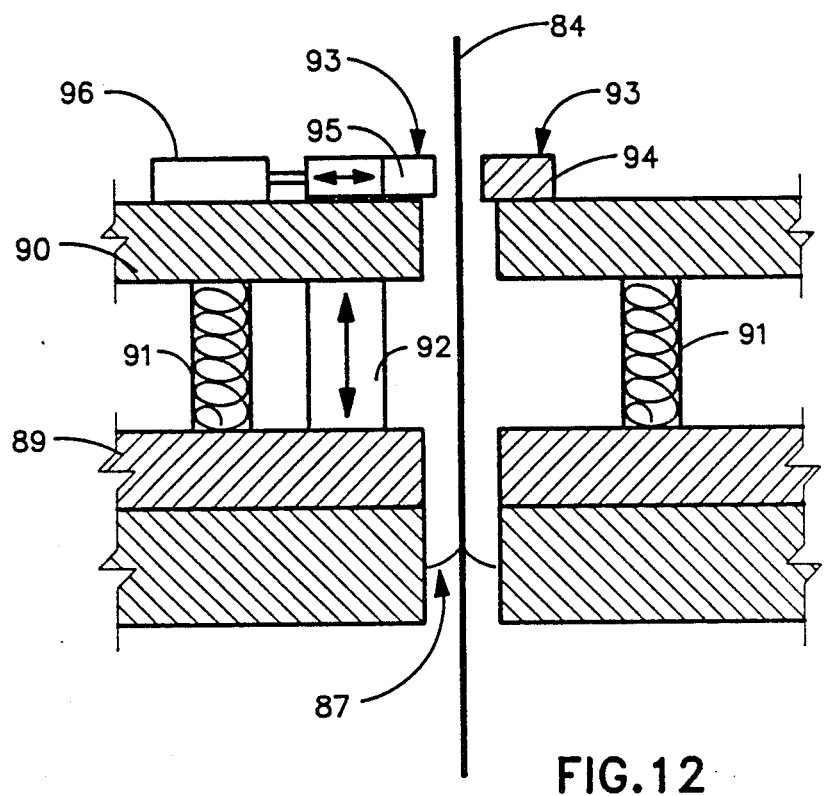
FIG. 12 is a side elevational view of one section of the outlet end of the detention basin depicted in FIG. 3C showing a vibrator mechanism that moves a tape-like cable of the adjustment mechanism to buckle the parallel lamina and promote cleaning of the parallel lamina, wherein the cable is also moved by a winch of the submerged adjustment mechanism to vary the inclination of the parallel lamina.

The lamina adjustment mechanism 51 is also effective to rapidly raise and lower or vibrate the beams 77 and the rungs 78 once they have been moved into a desired left-right position to locate the parallel lamina 49 at a desired angle 50 of inclination. As shown in FIG. 12, the adjustment mechanism 51 also includes a vibrator 88 that grips the tape 84 and moves it up and down rapidly. In detail, the vibrator 88 is mounted on the wall 28 and includes a base 89 secured to the wall 28. A vibrator table 90 is mounted on springs 91. A vibrator drive 92 is mounted on the base 89 and is connected to the table 90 for rapidly moving the table 90 up and down. A pair of shoes 93 includes a fixed shoe 94 and a movable shoe 95 that is controlled by a pneumatic motor 96 to grip the tape 84. When the shoes 94 and 95 grip the tape 84, the tape 84 is rapidly moved up and down, which causes the ladder 76 to move rapidly to the left and right, and thus up and down. The tabs 79 cause the bottoms 80 of the lamina 49 to move similarly, which causes a wave-like or buckling motion along the length of the lamina 49. Because of the thinness of the woven stainless steel strips 58 from which the sheets 59 of the lamina 49 are fabricated, each lamina 49 easily buckles and assumes a random curved shape from the bottom 80 to the vertex 56 when the vibrator drive 92 moves the beams 77. Such buckling occurs rapidly so that the flexure from the bottom 80 to the vertex 56 of each lamina 49 is effective to cause the solids 26 that have rested on or adhered to the lamina 49 to become dislodged therefrom. The dislodged solids 26 settle downwardly through each settling channel 53 and to the bottom 31 of the detention basin 29 for removal in a standard manner. For example, equipment such as that disclosed in applicant's U.S. Pat. No. 4,401,576 may be utilized to remove the settled solids 26 from the bottom 31 of the detention basin 29.

The adjustment mechanism 51 enables the operator of the clarifier 25A to achieve both of the above design goals in the operation of the clarifier 25A. In particular, to promote settlment of the solids 26 onto the lamina 49, the angle 50 of inclination is increased to move the lamina 49 more horizontal. To aid in settling the solids 26 to the bottom 31 of the detention basin 29, the lamina 49 are moved to a more vertical position and the vibrator 88 operated to promote movement of the solids 26 from the lamina 49 to the bottom 31 of the basin 29.

Methods of Operation of the First Embodiment

The present invention clarifies the liquid 27 by separating the suspended solids 26 from the liquid 27. The method performed by the preferred embodiment includes the step of dividing the detention basin 29 into the many settling channels 53. These are generally vertical flow paths 27A. The method includes the further step of releasably closing the top 55 of each such settling channel 53. This is performed by the overlapping free edges 48 in releasable sealing engagement with the overlapped fixed edges 47. The liquid 27 and the solids 26 are supplied to the detention basin 29 at a pressure that causes the liquid 27 to open each of the closed and releasably sealed settling channels 53 so that the clarified liquid 27C exits the detention basin 29 at a liquid flow rate that is sufficiently low to permit the solids 26 to settle in the settling channels 53. Such releasable sealing effect may be provided by the flexible characteristic of the flap members 53 from the fixed edges 47 at the vertices 56 to the free edges 48.

Another aspect of the method of the present invention for separating the solids 26 from the liquid 27 includes the steps of containing the liquid 26 and the solids 27 in the detention basin 29 and providing the plurality of parallel lamina 49 extending in such basin 29 at the angle 50 relative to the surface 44 of the liquid 27 for defining the separate settling channels 53. Each of the lamina 49 is moved to change its angle 50 relative to the surface 44 of the liquid 27 according to the settling characteristics of the solids suspended in the liquid and the operational goals for settling the solids 26. When the lamina 49 are the woven sheets 59 that are hung in the basin 29, the movement of the lamina 49 is controlled as described above to cause each lamina 49 to buckle to remove the solids 26 therefrom.

Referring to FIGS. 1 and 2A, the planar deck 42 is shown covering one entire section 37. The deck 42 thus covers the portion of the open top 30 of the basin 29 that coincides with the section 37. This portion of the top 30 of the basin 29 is divided into equal areas by the settling channels 53. The flexible characteristic of the flap members 43 is selected to be relatively uniform from flap member 43 to flap member 43. In this manner, even though the force of the liquid flowing upwardly in one quiescent zone is greater than that in another quiescent zone due to the random movements of the liquid 27, the flexible characteristic will tend to equalize the rate at which the liquid 27 flows through the same unit area defined by the settling channels 53.

Third Embodiment of Flow Control Deck 42

Figure 7:
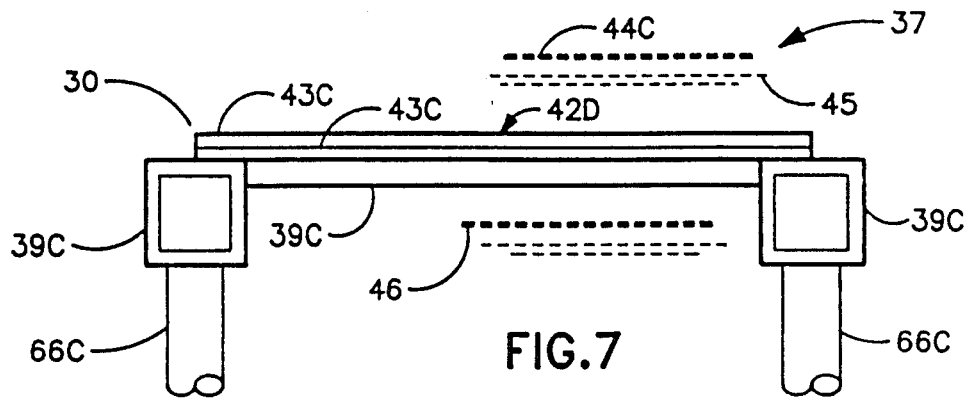
FIG. 7 is an end elevational view of the embodiment of the flow control deck shown in FIG. 6 also illustrating the beams on which the fixed edges of the flap members are mounted.

Reference is made to FIGS. 6 and 7 where a third embodiment of the flow control deck 42 is shown and is referred to as 42C. This embodiment of the deck 42C is used when it is primarily desired to separate the liquid 27 in the clarifier 25A into the respective upper and lower layers 45 and 46. As shown in FIG. 7, the second embodiment of the deck 42C extends at least part way across the open top 30 of the detention basin 29. In particular, the deck 42C extends across one section 37 of the detention basin 29. The deck 42C is formed from a series of sheet-like flap members 43C that have an overlapping relationship similar to that shown in FIGS. 4A and 4B, for example. However, and in general, the sheet-like flap members 43C are bent into an angular shape such that only a short section 97 (FIG. 6) depends from the vertex 56C of each flap member 43C. Each flap member 43C of the second embodiment of the deck 42C is supported on the beam 39C that is supported by a post 66C similar to the post 66 shown in FIGS. 5A and 5B. The beam 39C extends along the section 37 of the detention basin 29. The flat head bolts 65C secure the fixed edges 47C to the beams 39C, allowing the free edges 48C to move into open positions as described with respect to the free edge 48L shown in FIG. 4B.

Referring to FIG. 6, the beam type bracket 57B is connected to the beam 39C to provide added support to the flap members 43C. In the manner described above with respect to the deck 42, the deck 42C divides the liquid 27 in the basin 29 into the upper and lower layers 45 and 46, respectively. The portion of the open top 30 of the basin 29 that is covered by the deck 42C is also divided into equal areas by the flap members 43C. The deck 42C functions similar to the deck 42 to tend to equalize the rate of flow of the liquid 27 across those equal areas.

Fourth Embodiment of Flow Control Deck 42

Figure 8:
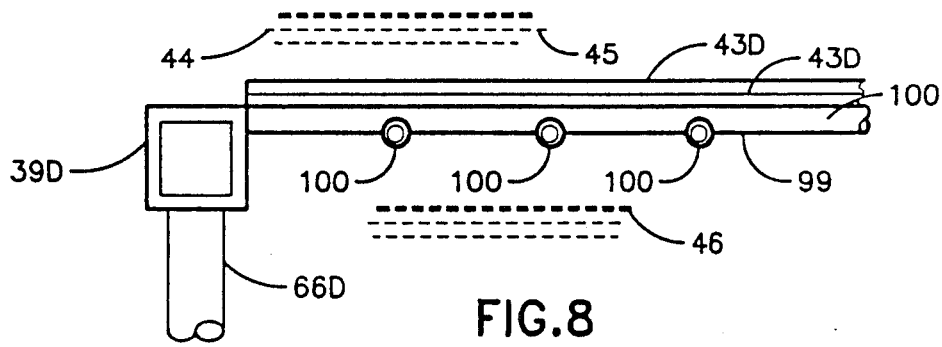
FIG. 8 is an end elevational view similar to FIG. 7 of a portion of another embodiment of the flow control deck without the depending parallel lamina, showing a mesh support for mounting the fixed edges of the flap members.
Figure 9:
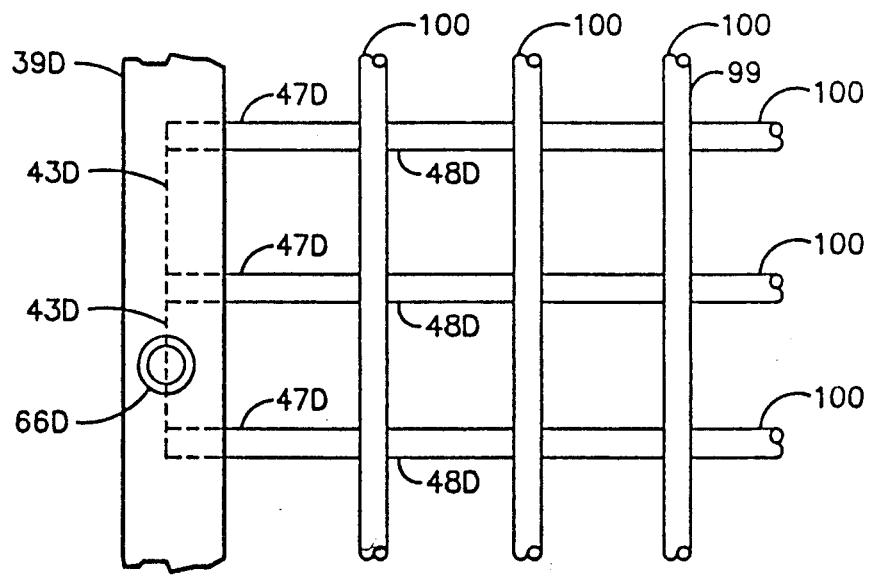
FIG. 9 is a plan view looking upwardly at the clarifier section shown in FIG. 8, showing the mesh supporting the fixed edges of the flap members.

Referring now to FIGS. 8 and 9, the flow control deck 42 may also be provided as generally shown in FIGS. 6 and 7 but without the short section 97 that depends from the flap members 43C of the second embodiment of the deck 42C. In particular, and referring to FIG. 8 and FIG. 9, the flap members 43D of the third embodiment of the deck 42D are in an overlapping relationship similar to that shown in FIGS. 4A and 4B. Such flap members 43D are held in that horizontal or planar, overlapping relationship by a rigid mesh structure 99 of open woven bars 100 that are supported on a beam 39D (similar to the beam 39C in FIG. 7) which is supported on a post 66D (similar to the post 66C in FIG. 7). To hold the fixed edges 47D of a given flap member 43D against movement, one of the bars 100 that extends under the fixed edge 47D of each flap member 43D is secured, such as by welding, to the fixed edge 47D of each flap member 43D, leaving the free edge 48D free. This is shown in FIG. 9 where the mesh 99 is shown extending with some of the bars 100 parallel to the length of the flap members 43D and the other bars 100 of the mesh 99 extending perpendicular thereto. The deck 42D functions in a manner similar to the deck 42C.

Fifth Embodiment—Flow Control Deck 42E

Figure 20A:
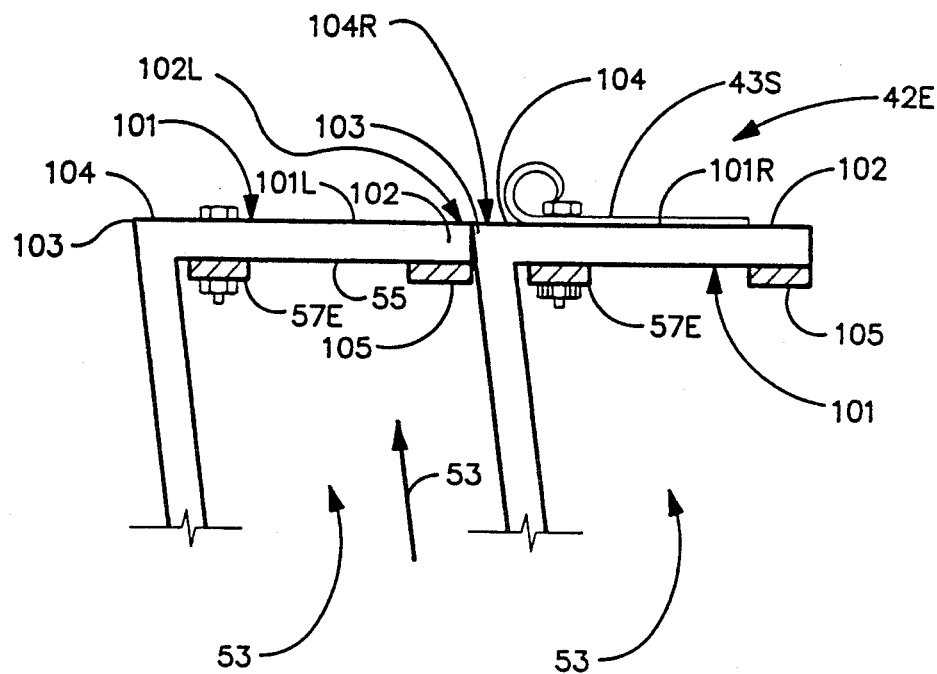
FIGS. 20A and 20B are side elevational views of another embodiment of the flap members in which the releasable sealing engagement is accomplished without overlapping the flap members.
Figure 20B:
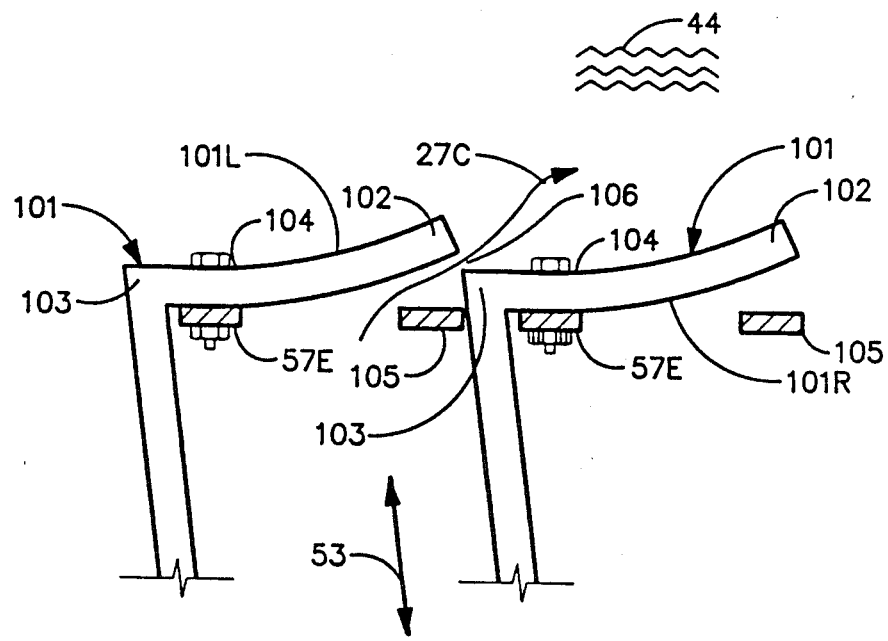

Referring now to FIGS. 20A and 20B, a fifth embodiment of the planar flow control deck 42 is shown. This embodiment is referred to using the reference number 42E and is provided with adjacent flap members 101 that do not overlap but that still provide a releasable sealing relationship between adjacent flap members 101. The releasable sealing relationship is formed by a free edge 102 of each flap member 101 moving into adjacent, but non-overlapping, relationship with a vertex 103 of the next adjacent flap member 101. As in the description of the flap members 43, the flap member 101L is on the left in FIG. 20 and the flap member 101R is on the right. In particular, the planar flow control deck 42E extends across at least a part of the detention basin 29, which is one of the sections 37. Each of the flap members 101 is elongated and has a fixed edge 104 and the opposing free edge 102. The fixed edge 104 of each flap member 101 is secured as by welding or being bolted to a bracket 57E that extends partly across the section 37 of the detention basin 29 in a manner similar to the bracket 57A. With the fixed edges 104 secured to the brackets 57E, in the absence of force from the upward flow of the liquid 27 the free edges 102 of the left flap members 43L are in releasable sealing engagement with the adjacent fixed edges 104R of an adjacent right flap member 101R. As shown in FIGS. 20A and 20B, the releasable sealing engagement results from a support bracket 105 (supported on the beam 39) below each free end 102 that holds the free end 102 adjacent the vertex 103 of the adjacent flap member 101R in a closed position. The position of the adjacent left and right flap members 101L and 101R, respectively, shown in FIG. 20A is referred to as the closed position. Opposite ends of each flap member 101 are positioned by the respective brackets 57E over the beams 39 as in FIGS. 5A and 5B. As a result, the area covered by the flap members 101 is effectively closed when the left flap member 101L is in the closed position shown in FIG. 20A. Thus, no clarified liquid 27C flows from the top 55 of the settling channel 53.

As shown in FIG. 20B, the free edges 102 of the left flap members 101L are free to move out of sealing engagement with the fixed edges 104 of the right adjacent flap member 101R in response to the force of the upwardly flowing liquid within the settling channel 53. The positions of the free edges 102 relative to the fixed edges 104 of the left flap member 101L shown in FIG. 20B are referred to as the open positions. In the open position, the left flap member 101L has flexed to provide a gap or opening 106 between the free edge 102 of the left flap member 101L and the adjacent fixed edge 104 of the right flap member 101R. Similar to that shown in FIG. 5B, this gap 106 is generally rectangular and results in the free edge 102L being spaced from the fixed edge 104R of the right flap member 101R. The upward movement of the free edge 102L of the left flap member 101L may also be limited by the plates 72. The plates 72 extend partially over the flap members 101 and are thus in position limit the upward movement thereof and to thus limit the cross-sectional area of the gaps 106. The gaps 106 permit the clarified liquid 27C to flow above the planar flow control deck 42E so that the clarified liquid 27C can flow toward the trough 36 of the detention basin 29.

Circular Clarifier 25B

Referring to FIGS. 13 through 18, the circular clarifier 25B is shown for removing the solids 26 from the liquid 27. The circular clarifier 25B is shown including the central cylindrical wall 60 that receives the liquid 27 and the solids 26 from the upper inlet 32B. The liquid 27 and the solids 26 flow downwardly and radially outward toward the annular clarifier section 62 and under the circular partition 61 that defines the inner side of the annular clarifier section 62. The outer cylindrical wall 63 defines the other side of the annular clarifier section 62.

With this structure of the annular clarifier section 62 in mind, it may be appreciated that it would be possible to install vertical, rigid plates (not shown) in fixed radial positions in the annular clarifier section 62, so that such plates are perpendicular to the curved partition 61 and the curved outer wall 63. However, because such plates are rigid, any attempt to tilt or incline them would first require that the vertical edges be trimmed so as to assume a curved shape that would conform to the curved paths of the intersections between such edges and the partition 61 and the wall 62. Without such trimming, there would be spaces between the straight vertical edges of the plate and the partition 61 and the wall 62. Further, such trimmed plates could not be angularly adjusted to change the incline angle without removal from the basin 29B and further trimming.

As described below, the circular embodiment of the present invention overcomes such limitations encountered when prior art rigid plates are to be used in circular clarifiers.

Annular Flow Control Deck 42B

In the circular clarifier embodiment of the present invention, an annular flow control deck 42B is provided at the top 107 of the annular section 62 of the circular clarifier 25B. Since the structure of such deck 42B is similar to that of the first embodiment of the deck 42, the elements of the deck 42 that are used in the deck 42B are referred to using the reference letter "B" with the prior reference number. This annular deck 42B is also formed from a plurality of elongated, sheet-like flap members 43B. As shown in greater detail in FIGS. 13 and 17, each of the flap members 43B has the two opposing edges 47B and 48B and is generally the same as the flap members 43 shown in FIGS. 2, 3A and 3B. The annular flow control deck 42B can have any of the various configurations 42C through 42E that are described above. In a preferred embodiment, the edge 47B of each of the plurality of flap members 43B is fixed and the opposite free edge 48B thereof is in releasable sealing engagement with an adjacent or right flap member 43BR. Thus, the opposite free edges 48B and the overlapping surfaces 68B are free to move out of engagement with the overlapped surfaces 64B of the adjacent flap members 43BR in response to the upward flow of the liquid 27 from the bottom 31B of the cylindrical basin 29B.

Figure 13:
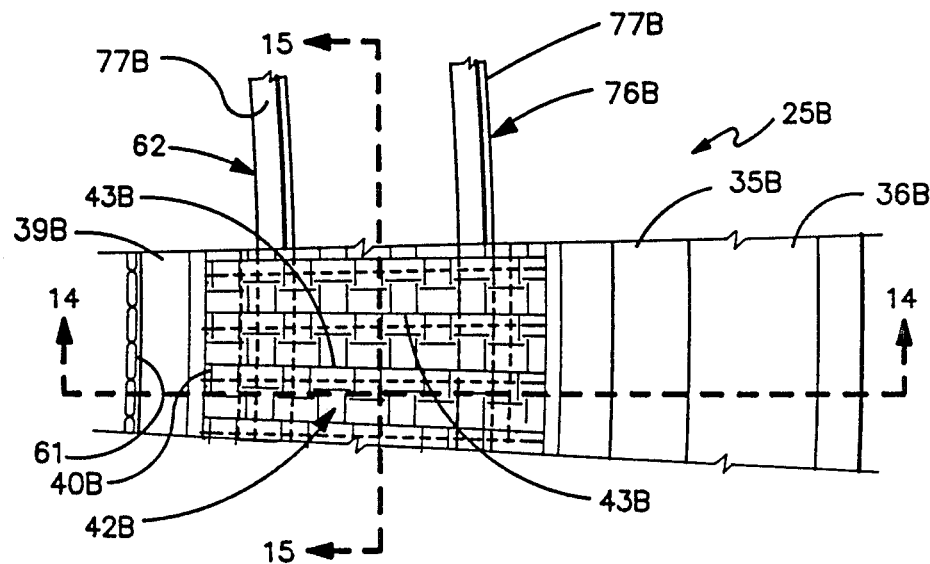
FIG. 13 is a plan view of a portion of a circular embodiment of the present invention showing radially extending lamina in an annular clarifier section of a circular detention basin.
Figure 17:
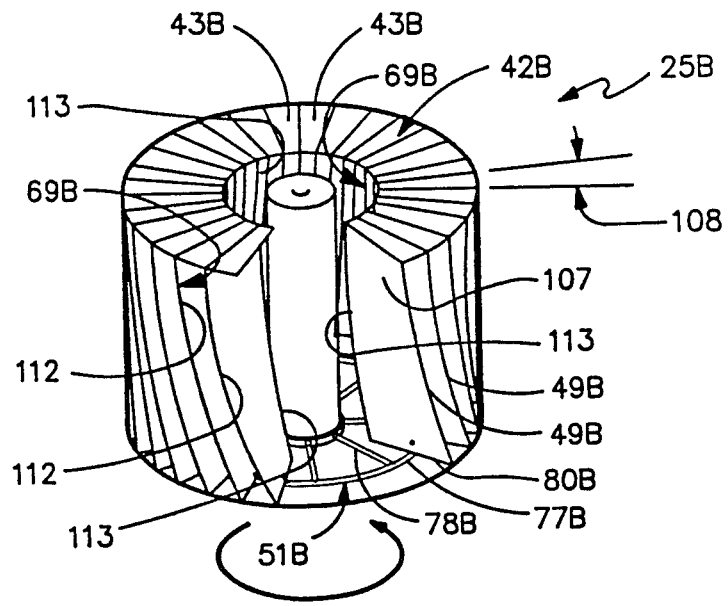
FIG. 17 is a perspective view of the circular clarifier shown in FIG. 13 illustrating the outer vertical edges of the lamina being curved to engage the outer wall of the detention basin as the lamina extend downwardly in an inclined position.

Referring in detail to FIGS. 13 and 17, two adjacent flap members 43BL and 43BR are shown positioned at an angle 108 relative to each other, such that they are not parallel as are the flap members 43L and 43R of the first embodiment (FIGS. 2 and 3A). This radial positioning of the fixed edges 47B at the angle 108 results in a tapering of the overlap of the free edges 48BL and the overlapping surfaces 68B over the fixed edges 47BR and the overlapped surfaces 64B. This overlap is somewhat less than one inch near the outer wall 63 and somewhat more than one inch near the partition 61. The free edges 48BL and the overlapping surfaces 68B, in cooperation with the fixed edges 47BR and the overlapped surfaces 64B, are still effective to close the tops 55B of the channels 53B of the circular clarifier section 62.

Except for the wedge-shape of the overlap of the flap members 43B, the flow control operation of the annular deck 42B is the same as that described above with respect to the planar deck 42. Thus, the flow of the liquid 27 through each gap 71B tends to be equal.

Adjustable Lamina 49B for Circular Clarifier 25B

In the embodiment of the annular controller deck 42B in which the quiescent zones 34B are to be formed, the circular clarifier 25B is also provided with flexible, inclined lamina 49B that form the quiescent zones 34B to assist in reducing the upward liquid flow so that the solids 26 carried by the liquid 27 settle and are separated from the liquid 27. The lamina 49B are formed integrally with, and extend downwardly from the vertices 56B of, the flap members 43B so that they hang in close relationship. Since the diameter of the outer cylindrical wall 63 may be about 100 feet and the radial extent of the clarifier section 62 may be only five feet, for example, the lamina 49B hang in generally but not exact parallel relationship since they are also connected to the radially extending fixed edges 47B that are at the angle 108 relative to each other. Adjacent pairs 52B of the lamina 49B form the quiescent zones 34B, which are effective as the separate inclined settling channels 53B.

Figure 14:
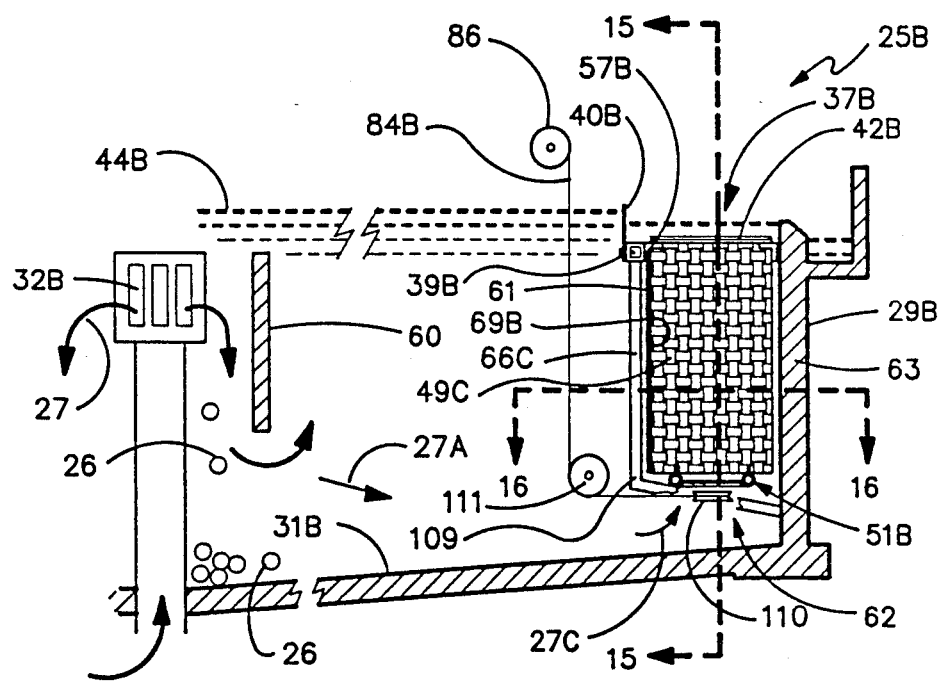
FIG. 14 is an elevational view taken along line 14—14 in FIG. 13 showing the outer vertical edges of the lamina extending along an outer wall of the circular detention basin and the inner edges of such lamina extending downwardly along a central circular partition.
Figure 15:
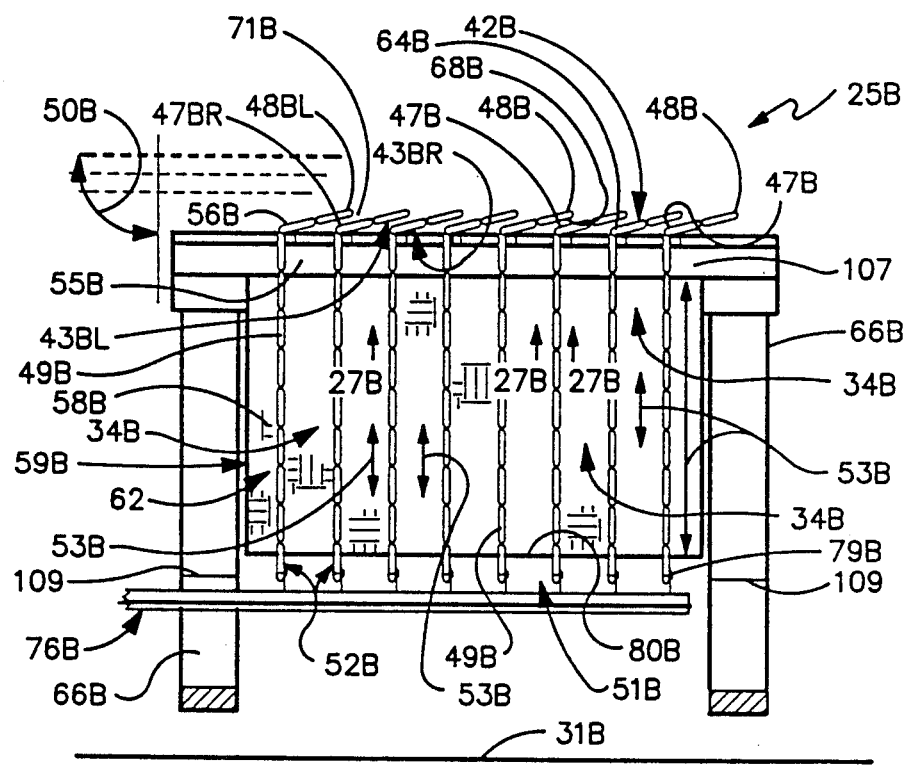
FIG. 15 is an elevational view taken along line 15—15 in FIG. 13 showing the lamina connected to a mechanism for changing, in tandem, the angle of inclination of the parallel lamina.

In a preferred embodiment of the circular clarifier 25B, the integral lamina 49B and flap members 43B are constructed from the sheet 59B formed from the same woven strips 58B of stainless steel material as is shown in FIGS. 10 and 11. As shown in FIGS. 14 and 15, the lamina 49B are mounted to the beam 39B on the brackets 57B in a manner similar to that shown in FIGS. 4A and 5A for the first embodiment. However, since the bottom 31B of the detention basin 29B must be clear of posts, etc. to allow a solids removal device (not shown) to scrape the bottom 31B underneath the clarifier section 25B, the post 66B has a knee 109 in it and is supported on the outer wall 63. Also, the cross baffle 40 is in the form of a circular baffle 40B. As shown in FIG. 13, the beams 39B, the weir 35B and the trough 36B are also circular.

Annular Lamina Adjustment Mechanism 51B

The angle 50B (FIG. 15) at which the lamina 49B are inclined is adjustable under the control of the submerged adjustment mechanism 51B. In the preferred embodiment of the circular clarifier 25B shown in FIGS. 13 through 18, each respective lamina 49B is connected to the submerged mechanism 51B that is effective to vary, in tandem, the angle 50B (FIG. 15) at which the lamina 49B hang from the vertices 56B. Such adjustment of the angular position of the lamina 49B with respect to the surface 44B of the liquid 27 in the annular clarifier section 25B of the detention basin 29B enables the circular clarifier 25B to function as desired despite variations in the liquid 27 or the solids 26 that are introduced into the detention basin and to accommodate the user's operational preferences.

Figure 16:
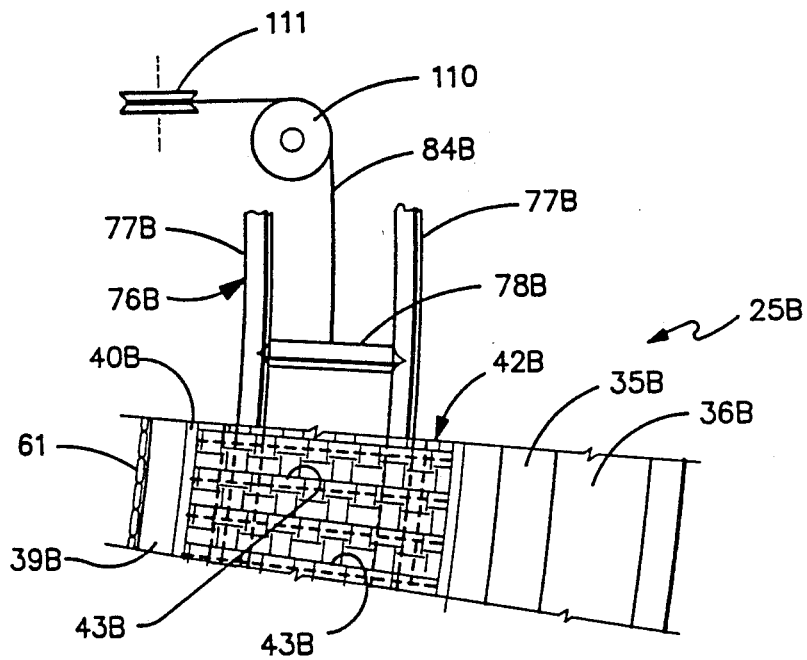
FIG. 16 is a plan view of a portion of FIG. 13 showing a second embodiment of the lamina adjustment mechanism for use in the annular clarifier section to adjust the angle of inclination of the parallel lamina.

Referring in detail to FIGS. 13 through 16, the adjustment mechanism is annular and is shown as an annular ladder-like structure 76B having the beams 77B in circular form that extend around the basin 29B above the bottom 31B of the annular clarifier section 37B. Cross pieces or rungs 78B of the ladder-like structure 76B extend radially between and are secured to the circular beams 77B. Each beam 77B is provided with the tabs 79B that are connected to the bottom edge 80B of each lamina 49B as described with respect to the lamina 49. The tabs 79B thus hold the bottom edge 80B of the lamina 49B in a radial direction. As shown in detail in FIG. 15, the annular lamina adjustment mechanism 51B is effectively suspended on and is thus supported vertically by the lamina 49B. The lamina 49B tend to hang vertically as shown in FIG. 15 but are moved into the inclined positions shown in FIGS. 17 and 18, for example, upon rotary movement of the beams 77B. Since the integral lamina 49B and flap members 43B are shown in the reversed-seven-shape, this movement is counterclockwise in FIG. 17. Such movement of the beams 77B is effective to swing each lamina 49B around the vertices 56B such that the beams 77B move upwardly as they swing to increase the inclination angle 50B. The clockwise-counterclockwise movement of the lamina adjustment mechanism 51B is controlled in a selective manner by a metal cable 84B that is attached to one of the rungs 78B (FIG. 16). The metal cable 84B extends around a submerged pulley 110, around another pulley 111 and then upwardly to a winch that is similar to the winch 86 (FIG. 3C) having the motor that can be accurately stepped to incrementally wind or unwind the metal cable 84B by selected lengths so that the positioning of the beams 77B can be selected.

Limit switches (not shown) can also be used to control the winch 86B so as to incrementally wind or unwind the cable 84B. Also, a squeegee or wiper 87 is provided for cleaning the tape 84B.

The lamina adjustment mechanism 51B is also effective to rapidly raise and lower (or vibrate) the beams 77B and the rungs 78B once they have been moved into a desired position to locate the parallel lamina 49B at a desired angle 50B of inclination. The adjustment mechanism 51B also includes the vibrator 88 (FIG. 3C) that grips the cable 84B and moves it up and down rapidly. The vibrator 88 is similar to that shown in FIGS. 3C and 12 and is not described in detail with respect to the clarifier 25B. The vibrator 88 moves the tape 84B rapidly up and down, which causes the ladder 76B to move rapidly clockwise and counterclockwise, and thus up and down. The tabs 79B cause the bottoms 80B of the lamina 49B to move similarly, which causes a wave-like or buckling motion along the length of the lamina 49B. Because of the thinness of the woven stainless steel strips 58B from which the sheets 59B of the lamina 49B are fabricated, each lamina 49B easily buckles and assumes a random curved shape from the bottom 80B to the vertex 56B when the vibrator drive 92 moves the beams 77B. Such buckling occurs rapidly so that the flexure from the bottom 80B to the vertex 56B of each lamina 49B is effective to cause the solids 26 that have rested on or adhered to the lamina 49B to become dislodged therefrom. The dislodged solids 26 settle downwardly through each settling channel 53B and to the bottom 31B of the detention basin 29B for removal in a standard manner.

The adjustment mechanism 51B enables the operator of the clarifier 25B to achieve both of the above design goals in the operation of the clarifier 25B. In particular, to promote settlement of the solids 26 onto the lamina 49B, the angle 50B of inclination is decreased to move the lamina 49B more horizontal. To aid in settling the solids 26 to the bottom 31B of the detention basin 29B, the lamina 49B are moved to a more vertical position and the vibrator 88 operated to promote movement of the solids 26 from the lamina 49B to the bottom 31B of the circular basin 29B.

Figure 18:
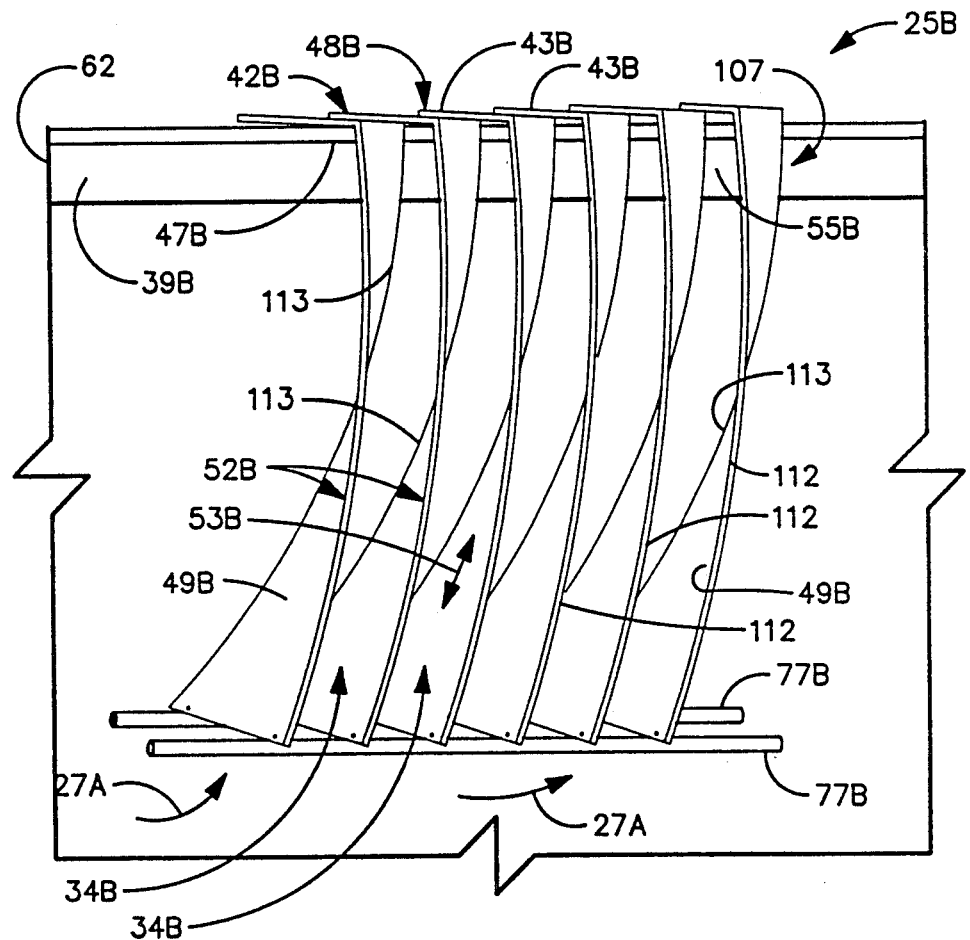
FIG. 18 is a side elevational view of the lamina shown in FIG. 17 illustrating the inner vertical edges of the lamina being curved to engage the inner partition of the detention basin, wherein the curvatures of those inner and outer edges are different.

It may be understood from FIG. 18 that the fixed edge 47B of the flap members 43B extends radially along a given radian. When the bottom 80B of a lamina 49B is moved counterclockwise the bottom 80B, which also extends radially, moves to a radian displaced by the angle 108 from the given radian.

Referring to FIGS. 17 and 18, the lamina 49B are shown with the side edges 69B extending along outer curved paths 112. In such paths 112, the outer edges 69B are in engagement with the outer wall 63 (FIG. 14) since the lamina 49B are flexible. The outer edges 69B remain in engagement with the outer wall 63 because of such flexibility of the lamina 49B. Thus, the outer edges 69B can extend in different curved paths 112 depending on the angle 50B of inclination of the lamina 59B. Similarly, the inner edges 69B of the lamina 59B extend along inner curved paths 113 adjacent the circular partition 61. In such paths 113, the inner edges 69B are in engagement with the partition 61 (FIG. 14) since the lamina 49B are flexible. The inner edges 69B remain in engagement with the partition 61 because of such flexibility of the lamina 49B. Thus the inner edges 69B can extend in different curved paths 113 depending on the angle of inclination 50B. The provision of the variably inclinable lamina 49B in the circular clarifier 25B provides more clarifier action since the nesting effect of the lamina 59B relative to each other can extend completely around the section 37B and need not stop, as with the deck 42 adjacent the weir 35 in FIG. 3C.

Floating Embodiment Clarifier 25C

Referring to FIG. 19, it may be understood that the clarifier 25 may be provided as a floating clarifier 25C in one section 37G. Here, the beams 39 are hollow and elongated vertically to form beams 39C. Hollow cross beams 114 extend from one beam 39C to the other beam 39C across the section 37G. The beams 39C and 114 are hollow and dimensioned to have a buoyant force sufficient to position the deck 42F at the desired location below the surface 44C of the liquid 27. A flexible discharge conduit 116 is connected to one side of a dam 115 to receive the clarified liquid 27C from the clarifier 25C and discharge liquid 27 from the basin 29. The deck 42F and the lamina 49F of the clarifier 25C may be configured as described above with respect to any of FIGS. 1 through 12, with the first embodiment of the clarifier 25 being preferred. Adjacent sections 37G can be open or receive similar floating clarifiers 25C.

While the preferred embodiments have been described in order to illustrate the fundamental relationships of the present invention, it should be understood that numerous variations and modifications may be made to these embodiments without departing from the teachings and concepts of the present invention. Accordingly, it should be clearly understood that the form of the present invention described above and shown in the accompanying drawings is illustrative only and is not intended to limit the scope of the invention to less than that described in the following claims.

What is claimed is:

1. Apparatus for clarifying liquid in which solids are suspended, comprising:
    basin means for receiving a flow of the liquid and the solids suspended therein;
    planar means extending across at least a part of said basin means for controlling the flow of the liquid and the solids in said basin means, said controlling means being formed from a plurality of sheet-like members, each of said members having two opposing edges; and
    means for holding one edge of each of said plurality of members in a fixed position in the liquid with an opposite edge of said members being in releasable sealing engagement with an adjacent holding means so that an opposite edge of each said member is to free to move out of sealing engagement with said adjacent member in response to the liquid in said basin means.

2. An apparatus for clarifying liquid according to claim 1, wherein:
    said basin means contains the liquid so that the upper surface of the liquid is at a desired level; and
    said holding means positions said planar means below the upper surface of the liquid.

3. An apparatus for clarifying liquid according to claim 1, wherein:
    said holding means supports each of said members with said opposing edges horizontal; and
    each of said members is flexible so that each said member flexes from said one edge to said opposite edge in response to the liquid.

4. Apparatus according to claim 1 in which the liquid received in said basin means has an upper surface, further comprising:
    dividing means having upper and lower ends and being positioned in a generally vertical orientation in relation to said surface of the liquid for separating the liquid into a separate flow path beneath each said sheet-like member; and
    means connected to said lower ends of said dividing means for moving said lower ends to change the angle of inclination of said dividing means relative to said surface of the liquid according to the suspension characteristics of the solids suspended in the liquid.

5. Apparatus for clarifying liquid according to claim 1, in which:
    said holding means holds said members in said basin means to form a deck extending horizontally under the upper surface of the liquid.

6. Apparatus for clarifying liquid according to claim 5, further comprising:
    separate sections formed in said basin means,
    said planar means being held by said holding means to extend across each said section, and
    said members held in releasable sealing engagement being effective to control the flow of the liquid and the solids in each said section.

7. Apparatus for clarifying liquid according to claim 6, in which:
    the movement of said opposite edges of said members in one said section is in response to the flow of the liquid in said section.

8. In an apparatus for clarifying flowing liquid by separating suspended solids from the liquid, the improvement comprising:
    flow controller barrier means for dividing at least a portion of the liquid into upper and lower sections, said barrier means including a plurality of elongated members, each of said members having opposing free and fixed ends;
    means for mounting said elongated members so that each said member is cantilevered with the free end thereof in releasable sealing engagement with a fixed end of an adjacent one of said members to form a horizontal planar barrier between said upper and lower sections of the liquid; and
    means for supplying the liquid and the suspended solids beneath said barrier means to create a pressure differential tending to move said free end of each of said members upwardly to promote equal liquid flow from the lower section to the upper section through each unit of area covered by said barrier means.

9. In an apparatus according to claim 8, the improvement further comprising:
    dividing means mounted beneath said barrier means for dividing said lower section into a plurality of separate liquid flow channels, each said channel being effective to supply liquid to one of said members.

10. In an apparatus according to claim 8, the further improvement comprising:
    each fixed end of each said member is provided with a lamina extending downwardly therefrom into said lower section;
    said lamina being parallel and spaced from adjacent lamina by a selected distance to form separate liquid flow channels for guiding the liquid from the supplying means upwardly toward said barrier means; and each of said members overlies one of said flow channels and said free end thereof is urged toward contact with said fixed end of said respective adjacent member to tend to close said respective flow channel.

11. Apparatus according to claim 10, wherein:
each said member and said lamina provided therewith are connected by a flexible joint.

12. Apparatus according to claim 11, wherein:
each of said connected member and said lamina is formed from strips of metal or plastic material that are woven to form flat sheets that can be rolled into a cylindrical shape, said flat sheets being deformable to form said flexible joint.

13. In an apparatus according to claim 10, the improvement further comprising:
one said flow channel being formed from adjacent ones of said spaced lamina, one said member and one said lamina being integral and connected by a joint, and
said mounting means is an elongated support connected adjacent each said joint so that each said lamina hangs downwardly therefrom and said member is cantilevered therefrom.

14. In an apparatus according to claim 10, the improvement further comprising:
the urging of said free end toward contact with said fixed end being with a force increasing with increased distance between said free and said fixed end.

15. Apparatus according to claim 11, in which:
each said connected member and lamina are integral parts of a woven sheet and said flexible joint is a bend in said sheet.

16. A system for clarifying liquid that is particle-laden, comprising:
means for supplying particle-laden liquid to said system;
means for defining an opening through which the liquid flows out of said system; and
means mounted on said defining means and extending over at least a portion of said opening for normally closing said portion of said opening, said closing means being movable in response to the force of the liquid tending to flow through said portion of said opening to control the flow of the clarified liquid out of said system, said closing means including a plurality of spacer means for dividing the particle-laden liquid into separate liquid flow channels and dividing said portion of said opening into sections, one said section being provided for each said flow channel so that the liquid flowing in a given one of said flow channels exits said system through a given section of said opening;
each of said spacer means including a horizontal member having first and second portions, a first of said portions of one of said members being in releasable sealing engagement with a portion of a second of said members, a given one of said members normally being effective to close and releasably seal a given one of said sections of said opening and being adapted to be moved in response to the liquid tending to flow through said given sectin of said opening such that said first portion of said given member moves out of the sealing engagement with said portion of said second member to form an outlet from each said separate liquid flow channel, each of said outlets having substantially the same area, said members being effective to promote relatively equal liquid flow rates in each of said channels.

17. A system according to claim 16, wherein:
the particles are suspended in the liquid and tend to settle out of the liquid when the liquid is quiescent;
each said spacer means is a sheet having said horizontal member and a divider, said divider and said horizontal member being integral and flexible with a joint therebetween, each said integral member and divider being flexible so that said member is urged to releasably close its respective section of said opening.

18. A system according to claim 16, wherein:
the liquid carries the particles suspended therein:
said defining means is a detention basin having walls that define said opening, at least one of said walls being lower than the other walls to form a weir for allowing the liquid that flows through said opening to flow out of said basin;
said spacer means also extends generally vertically in said basin so that said separate flow channels direct the particle-laden liquid upwardly from the bottom of said basin toward said respective sections of said opening; and
each said horizontal member is below the upper level of said weir and is effective to reduce the flow rate in the respective flow channel before the liquid flows through said respective section of the opening.

19. A system according to claim 16, further comprising:
basin means for receiving the liquid and the particles in the form of settleable solids to be removed for clarifying the liquid; and
said means for supplying being effective to supply the liquid and the solids to said basin means at the bottom of said flow channels under sufficient pressure that the liquid flowing in each said flow channel moves said respective horizontal member corresponding to each said flow channel to form said outlets having said areas that are small enough to promote a pressure differential, thus promoting settling of the solids from the liquid.

20. Apparatus according to claim 17, wherein:
each said one piece of sheet-like material is formed from strips of metal or plastic that are woven and then bent to form said member and attached lamina.

21. A system according to claim 17, wherein:
said integral and flexible horizontal member and divider being effective to close their respective section of said opening with a force that varies according to the distance between said first edge of said member and said second edge of said second member so that there is resistance to the tendency of the flow rates in said flow channels to be different.

22. Apparatus according to claim 17, wherein:
said integral and flexible horizontal member and divider being effective to close their respective section of said opening with a force that varies according to the distance between said first edge of said member and said second edge of said second member so that there is resistance to the tendency of the flow rates in said flow channels to be different.

23. A system according to claim 17, wherein:

said member is urged to releasably close its respective one of said sections with a force that is linear with respect to the amount of said movement of said first portion of said given member out of said sealing engagement.

24. A system according to claim 17, wherein:
said member is urged to releasably close its respective one of said sections with a force that increases with increasing amounts of distance of said first portion of said given member out of said sealing engagement.

25. Apparatus for separating settleable solids from liquid, comprising:
a detention basin for containing the liquid and the solids the liquid having an upper surface;
a plurality of parallel lamina extending in said basin at an angle relative to the surface of the liquid in said basin for defining separate liquid flow channels, each of said lamina being formed from a plurality of thin strips, said strips being woven to form a thin sheet; and
means for moving each of said lamina to change the angle of each of said lamina according to the settling characteristics of the settleable solid.

26. Apparatus for clarifying liquid according to Claim 25, further comprising:
means for periodically moving said moving means vertically so that said woven lamina are buckled in a wave-like motion to promote cleansing of said lamina.

27. Apparatus according to claim 25, wherein:
said moving means includes a common member attached to each of said lamina and means for selectively positioning said common member to change the angle of each of said lamina by the same amount.

28. Apparatus according to claim 25, further comprising:
each of said sheets having opposite sides and being bent from one said side to another said side to form a vertex; and
means adjacent each said vertex and secured to said opposite sides of each said sheet for mounting said sheets in said basin.

29. Apparatus according to claim 25, further comprising:
each of said sheets having opposite sides and being bent from one said side to another said side to form a vertex; and
means adjacent each said vertex and extending under the bent portion of each said sheet for mounting said sheets in said basin.

30. Apparatus for separating settleable solids from liquid to clarify the liquid, comprising:
a detention basin having walls for containing the liquid and the settleable solids and an outlet for clarified liquid;
a plurality of parallel lamina, adjacent ones of said lamina dividing at least a portion of said detention basin into a plurality of flow channels, each of said channels being open adjacent the bottom of said basin for receiving the liquid and the solids and guiding the liquid and the solids toward the surface of the liquid;
a flow controller member attached to each lamina and extending generally parallel to and under the surface of the liquid, a first of said members extending from its respective lamina in releasible sealing engagement with the adjacent end of the next adjacent member; and
means for flowing the liquid and the settleable solids into said detention basin to create a pressure differential causing the liquid and the solids to flow upward in said channels toward said members, each said member being movable out of the sealing engagement with said next adjacent member in response to the liquid flowing upward in its respective channel to open its respective channel formed by said adjacent lamina and allow the clarified liquid to flow out of said channel toward said outlet.

31. An apparatus for clarifying liquid according to claim 30, wherein:
said flow controller members are supported by at least one floating structure.

32. Apparatus according to claim 30, further comprising:
each said lamina and said member attached thereto are generally in the cross section of a "number 7" and extend at least partially across said basin so that said channels are elongated; and
a support rod extending under each said member adjacent said attached lamina for holding adjacent ones of said members in releasable sealing engagement with said adjacent member, with one edge of each said member being free to move out of engagement with the adjacent member in response to the flow of liquid in the respective one of said channels.

33. Apparatus according to claim 30, wherein:
each said attached member and lamina is formed from one piece of sheet-like material that is bent at about a 90 degree angle with said sheet-like material being flexible to enable each said member of move relative to each respective lamina to allow the liquid to exit said channels.

34. Apparatus for separating settleable solids from liquid, comprising:
a detention basin for the liquid and the solids, said basin having an outlet;
barrier means for releasably dividing at least a portion of the liquid in said detention basin into upper and lower sections;
means for supplying the liquid and the solids to said lower section of said detention basin, said supplying means creating a pressure differential so that the liquid flows through said barrier means from said lower section to said upper section in said detention basin;
dividing means for creating a plurality of separate liquid flow channels in said lower section of said detention basin, each said channel having an upper end;
means for supporting said barrier means and said dividing means in said lower section of said detention basin with said barrier means below the surface of the liquid;
means for moving said dividing means to position said channels at common selectable angles in relation to the surface of the lqiuid in said detention basin to promote cleaning of said dividing means and settlement of the solids from the liquid; and
means for connecting said barrier means to said dividing means so that said upper end of each of said channels is releasably closed by said barrier means to render the liquid relatively quiescent in said channels and promote settlement of the solids in said lower section, said upper end of each of said channels being openable in response to the pressure differential so that the liquid flows uniformly from each of said channels into said upper section of said detention basin and toward said outlet.

35. Apparatus according to claim 34, wherein:
said barrier means, said dividing means and said connecting means include a plurality of generally L-shaped lamina positioned by said supporting means in inverted L position with the respective barrier means being formed by the horizontal legs of the inverted L-shaped lamina and the dividing means being formed by the generally vertical legs of the inverted L-shaped lamina, said connecting means being formed by the junction of said legs of a given inverted L-shaped lamina, said supporting means being provided at regular intervals and extending at least partially across said detention basin adjacent each said junction and underneath said horizontal legs for positioning said horizontal legs in releasable sealing engagement with said adjacent horizontal legs so that one edge of each said horizontal leg normally releasably engages the adjacent horizontal leg to close said channel formed by adjacent generally vertical pairs of said vertical legs, said horizontal legs being adapted to be moved in response to the pressure differential so that each said edge of said horizontal leg moves out of said releasable sealing engagement with said adjacent horizontal leg to permit the liquid to flow from each of said channels.

36. Apparatus according to claim 35, wherein:
said junction and said horizontal leg of each said inverted L-shaped lamina are designed to require increasing amounts of force from the pressure differential in a given one of said channels to provide increasing amounts of flexure of said horizontal legs from said junction to said one edge of said adjacent horizontal leg so that the amount that the top of each said channel opens is relatively the same.

37. Apparatus for clarifying liquid by removing solids from the liquid, comprising:
a cylindrical basin having an outer curved wall, an outlet and an inner curved partition for defining an annular clarifier portion of said basin, said clarifier portion containing the liquid and the solids, said liquid having an upper surface, said clarifier portion of said basin being divided into a plurality of wedge-shaped sections by angularly spaced and radially extending first and second planes, said planes intersecting at the axis of said cylindrical basin;
means for supplying the liquid and the solids into said basin for flow upwardly into said clarifier portion'
planar flow controller means radially extending across at least part of said clarifier portion of said basin, said controller means being formed from a plurality of planar sheet-like members, each said member having opposing fixed and free ends;
a plurality of flexible lamina each having first, second, third and fourth sides, each said lamina being positioned at an angle relative to the surface of the liquid and adjacent to other said lamina in a radial arrangement around said partition, said first sideof each of said lamina being adjacent said outer curved wall of said basin, said third side of each of said lamina being adjacent said partition, said second side of each said lamina being in said second plane, said fourth side of each said lamina being in said first plane and underlying said controller means; and
means for supporting said flow controller means in the liquid with one of said members in releasable sealing engagement with an adjacent one of said members, so that said free end of one said member is adapted to move out of sealing engagement with said adjacent member in response to pressure differentials created by the upward flow of liquid in said clarifier portion of said basin to permit clarified liquid to flow to said outlet.

38. Apparatus for clarifying liquid by separating suspended solids from the liquid, comprising:
a cylindrical detention basin having an outlet, a curved outer wall and a central cylindrical partition provided with a smaller radius than that of said outer wall to form an annular clarifier section within which liquids and solids suspended therein are contained;
means for flowing the liquid and the solids upwardly in said clarifier section;
planar flow controller means extending radially from said curved wall to said cylindrical partition for controlling the flow of the liquid and the solids in said clarifier section, said controller means being formed from a plurality of sheet-like members, each of said members having two opposing edges;
means for holding one edge of each of said plurality of members in a fixed position in the liquid with an opposite edge of each of said members being in releasable sealing engagement with an adjacent one of said members so that said opposite edge of each said member is free to move out of sealing engagement with said adjacent member in response to the upward flow of the liquid in said clarifier section to allow clarified liquid to flow toward said outlet;
a plurality of parallel lamina extending downwardly in said clarifier section at a variable angle relative to the surface of the liquid in said basin for defining separate liquid flow channels in said clarifier section;
means for moving said lamina in tandem to change said angle of said lamina according to the settling characteristics of the solids suspended in the liquid; and 39. Apparatus for separating settleable solids from liquid, comprising:
a detention basin having a curved outer wall for containing the liquid and the solids, said basin having a curved partition having a radius less than the radius of said curved outer wall of said detention basin, the liquid in said basin having an upper surface;
a plurality of normally flat, flexible lamina, each of said lamina having upper and lower edges and having normally straight opposing sides;
means for mounting each upper edge of each said lamina along a different upper radial path extending from said curved outer wall of said detention basin to said partition; each of said lamina extending downward at an angle relative to the upper surface of the liquid, said plurality of lamina defining separate liquid flow channels; and
means connected to said lower edge of each said lamina for tandemly positioning said lower edges along different lower radial paths that are angularly and vertically off-set relative to said upper radial paths corresponding to a given one of said lamina so that said opposing normally straight sides of each said lamina extend along curved paths adjacent both said curved outer wall and said partition to define liquid flow paths.

40. Apparatus according to claim 39, wherein:
said wall and said partition form an annular clarifier section; and
said plurality of lamina are mounted by said mounting means and said positioning means all around said annular clarifier section in a continuous nested relationship.

41. Apparatus according to claim 39, further comprising:
planar flow controller means having a plurality of planar sheet-like members, said members having one free edge and one fixed edge, said fixed edge of each of said members extending from said curved wall along a different one of said upper radial paths to said partition, each of said fixed edges of said members being connected to one of said upper edges of one of said lamina so that said corresponding free edge extends over said fixed edge of an adjacent member to releasably seal the corresponding flow channel.

42. Apparatus according to claim 39, further comprising:
means for selectively moving said positioning means to change said angle at which said lamina extend downward;
said normally straight opposing sides extending along said curved paths adjacent both said wall and said partition at various angles at which said lamina extend downward.

43. Apparatus for clarifying liquid by separating suspended solids from the liquid, comprising:
a cylindrical detention basin having an outlet, an outer wall and a central cylindrical wall;
a cylindrical partition having a radius less than the radius of said outer wall of said detention basin to form an annular clarifier section, the liquid and the solids being contained in said clarifier section, said cylindrical detention basin having a central axis;
said annular clarifier section having wedge-shaped sections defined by angularly spaced first and second planes extending radially through said central axis of said cylindrical basin, said first plane also defining an upper radius of said cylindrical basin and said second plane also defining a lower radius offset at an angle from said upper radius;
flow controller barrier means for dividing at least a portion of the liquid in said clarifier section into upper and lower layers, said barrier means including a plurality of elongated members extending radially from said partition to said outer wall, each of said members having a first fixed edge and an opposing second free edge;
means for mounting said elongated members so that each said member is cantilevered from said fixed edge with said free edge thereof in releasable sealing engagement with an adjacent one of said members to form an horizontal annular barrier between said upper and lower layers of the liquid;
means for supplying the liquid and the suspended solids beneath said barrier means to create a pressure differential tending to move said free edge of each of said members upwardly out of the sealing engagement to promote equal liquid flow toward said outlet from the lower layer to the upper layer through each unit area covered by said barrier means; and
means for moving said lamina in tandem to change said angle of each of said lamina according to the settling characteristics of the solids suspended in the liquid.

44. A method of clarifying liquid by separating suspended solids from the liquid, comprising the steps of:
dividing a detention basin into a plurality of generally vertical flow paths each having an upper end,
releasably closing said upper end of each of said flow paths, and
supplying the liquid and the solids to the basin with a pressure differential that causes the liquid to open each of said releasably closed flow paths so that the liquid exits said basin with a liquid flow rate sufficiently low to permit the solids to settle in said flow paths.

45. The method of claim 44, wherein:
said step of releasably closing applies a force in the direction opposite that of the liquid flow in each said flow path, the closing force increasing with increased flow rate so that the flow rates in said plurality of flow paths tend to equalize and promote uniform settlement of the solids in said flow paths.

46. A method of separating settleable solids from liquid, comprising the steps of:
mounting a plurality of sheet-like members horizontally in a clarifier basin so that each said member is in releasable sealing engagement with an adjacent one of said members, each of said members having opposing edges with one edge of each said member fixed against vertical movement and the other edge of said member free to move into and out of said sealing engagement;
forming a separate liquid flow channel beneath each said member; and
flowing the liquid upwardly in said channels toward each said member while the settleable solids settle in said channels, said free edges of each said member being moved uniformly away from said respective adjacent member to allow the liquid to flow uniformly from said channels to an outlet of said basin.

47. The method of claim 46, wherein:
said flowing of the liquid in said liquid flow channels is at a pressure differential that is sufficient to cause the liquid to flow upwardly in each said channel at a rate of flow selected to promote settlement of the solids and selected to cause said free edges of said members to move and allow the liquid to flow at relatively equal flow rates from said channels.

48. A method of separating settleable solids from liquid, comprising the steps of:
containing the liquid and the solids in a detention basin;
weaving thin strips into closely spaced relationship to form a plurality of thin lamina;
bending each said lamina along one edge thereof to form a member extending from each said lamina;
providing a plurality of said lamina in said basin;
supporting each said lamina under each said member so that each said lamina is free to move to variable angles relative to the surface of the liquid in said basin, said lamina being supported in parallel relationship for defining separate liquid flow channels;

flowing the liquid and the solids in each said channel to cause the solids to settle; and moving each of said lamina to change said angle of each of said lamina according to the settling characteristics of the solids suspended in the liquid.

49. Apparatus for separating settleable solids from liquid, comprising:

a detention basin for containing the liquid and the solids the liquid having an upper surface;

a plurality of parallel lamina extending in said basin at an angle relative to the surface of the liquid in said basin for defining separate liquid flow channels, each of said lamina being formed from a plurality of thin strips, said strips being woven to form a thin sheet; and means for moving each of said lamina to change the angle of each of said lamina according to the settling characteristics of the settleable solids;

said moving means includes a common member attached to each of said lamina and means for selectively positioning said common member to change the angle of each of said lamina by the same amount;

said common member is releasably attached to each said lamina to permit removal of said lamina from said basin.

* * * * *